United States Patent
Grant et al.

(10) Patent No.: US 9,708,062 B2
(45) Date of Patent: Jul. 18, 2017

(54) AIRCRAFT LAVATORY FOR A PERSON WITH REDUCED MOBILITY

(75) Inventors: Robert Grant, Montreal (CA); Mark Mathieu, Ste. Marthe Sur Le Lac (CA)

(73) Assignee: C SERIES AIRCRAFT LIMITED PARTNERSHIP, Mirabel, Quebec (CA)

( * ) Notice: Subject to any disclaimer, the term of this patent is extended or adjusted under 35 U.S.C. 154(b) by 828 days.

(21) Appl. No.: 13/449,440

(22) Filed: Apr. 18, 2012

(65) Prior Publication Data

US 2012/0261509 A1    Oct. 18, 2012

Related U.S. Application Data

(60) Provisional application No. 61/476,364, filed on Apr. 18, 2011.

(51) Int. Cl.
*B64D 11/02* (2006.01)
(52) U.S. Cl.
CPC .................................. *B64D 11/02* (2013.01)
(58) Field of Classification Search
USPC ..................................... 4/663, 664, 476, 480
See application file for complete search history.

(56) References Cited

U.S. PATENT DOCUMENTS

| | | | | |
|---|---|---|---|---|
| 3,275,283 A | * | 9/1966 | Rauch | 248/27.1 |
| 4,884,767 A | * | 12/1989 | Shibata | 244/118.5 |
| 5,678,883 A | * | 10/1997 | Bittner et al. | 296/178 |
| 6,615,414 B2 | * | 9/2003 | Miller et al. | 4/476 |
| D486,565 S | | 2/2004 | Itakura | |
| D487,137 S | * | 2/2004 | Itakura | D23/274 |
| 6,938,284 B2 | * | 9/2005 | Kitade et al. | 4/664 |
| 7,222,820 B2 | | 5/2007 | Wentland et al. | |
| 7,284,287 B2 | * | 10/2007 | Cooper et al. | 4/664 |
| D583,917 S | | 12/2008 | Bock et al. | |
| D593,643 S | | 6/2009 | Bock et al. | |
| D593,644 S | | 6/2009 | Bock et al. | |
| D593,645 S | | 6/2009 | Bock et al. | |

(Continued)

FOREIGN PATENT DOCUMENTS

| | | |
|---|---|---|
| CA | 2423216 A1 | 9/2003 |
| DE | 19913318 A1 | 1/2000 |

(Continued)

OTHER PUBLICATIONS

Canadian Office Action dated Feb. 23, 2017, for Canadian Patent Application No. 2,737,577.

*Primary Examiner* — Erin Deery
(74) *Attorney, Agent, or Firm* — Karceski IP Law, PLLC

(57) ABSTRACT

An aircraft lavatory includes first and third walls extending inwardly from a second wall and a fourth wall connecting the first wall to the third wall. A countertop extends along a portion of the first wall. A sink is disposed in the countertop. The countertop defines an under-countertop recess free from obstructions. A toilet is disposed adjacent to both the second wall and the third wall and defines a toilet axis bisecting the toilet. A door extends along at least a portion of the third wall. An access axis is defined that is disposed at an access angle with respect to the toilet axis. When a person in a wheelchair enters the lavatory area along the access axis, the countertop recess accommodates at least a portion of the person's body.

43 Claims, 29 Drawing Sheets

(56) References Cited

U.S. PATENT DOCUMENTS

| | | | |
|---|---|---|---|
| D593,646 S | 6/2009 | Bock et al. | |
| D593,647 S | 6/2009 | Bock et al. | |
| D605,740 S | 12/2009 | Bock et al. | |
| D605,741 S | 12/2009 | Bock et al. | |
| 7,866,603 B2 * | 1/2011 | Cooper et al. | 244/118.5 |
| 2004/0003461 A1 * | 1/2004 | Leclercq et al. | 4/664 |
| 2004/0123381 A1 | 7/2004 | Kitade et al. | |
| 2004/0163170 A1 | 8/2004 | Cooper et al. | |
| 2004/0227034 A1 | 11/2004 | Wentland et al. | |
| 2005/0116099 A1 | 6/2005 | Pho et al. | |
| 2006/0150316 A1 | 7/2006 | Fukuizumi et al. | |
| 2006/0289698 A1 | 12/2006 | Quan | |
| 2008/0265092 A1 | 10/2008 | Cooper et al. | |

FOREIGN PATENT DOCUMENTS

| | | |
|---|---|---|
| DE | 19013356 A1 | 9/2000 |
| DE | 29924487 U1 | 6/2003 |
| EP | 2060469 A2 | 5/2009 |
| JP | 5155390 A | 6/1993 |
| JP | 6040399 A | 2/1994 |
| JP | 6189872 A | 7/1994 |
| JP | 2003267296 A | 9/2003 |
| JP | 2005067600 A | 3/2005 |
| JP | 2006006915 A | 3/2005 |

\* cited by examiner

AIRCRAFT LAVATORY FOR A PERSON WITH REDUCED MOBILITY

CROSS-REFERENCE TO RELATED APPLICATION(S)

This Patent Cooperation Treaty Patent Application relies for priority on U.S. Provisional Patent Application Ser. No. 61/476,364, filed on Apr. 18, 2011, the content of which is incorporated herein by reference.

FIELD OF THE INVENTION

The present invention concerns layouts for a lavatory. More specifically, the present invention provides layouts for an aircraft lavatory that provide features to accommodate a person with reduced mobility, such as a person in a wheelchair.

DESCRIPTION OF THE RELATED ART

The prior art include several examples of lavatories for aircraft that address a number of different concerns with respect to lavatories, in particular aircraft lavatories.

For example, U.S. Pat. No. 7,866,603 (hereinafter "the '603 Patent") describes methods and apparatus for an aircraft lavatory that is handicapped-accessible. The lavatory 100 includes a door 106, a front wall 102, a top wall (or ceiling 110), a floor 108, and various side walls (such as wall 104). (The '603 Patent at col. 3, lines 36-39.) The lavatory 100 is configured to fit into the hull of a particular commercial airliner or other aircraft. (The '603 Patent at col. 3, lines 41-44.) A wheelchair region 310 is generally adjacent to a toilet assembly 210 and is configured to accommodate a wheelchair. (The '603 Patent at col. 4, lines 35-37.) The wheelchair region 310 is defined by a footprint with a width 311 and a length 312 and has an orientation defined by its major axis. (The '603 Patent at col. 4, lines 38-40.)

In the '603 Patent, the wheelchair region 310 is opposite to and aligned with the door 106 such that a passenger may manipulate the wheelchair through the door 106 backwards and come to rest in the wheelchair region 310. (The '603 Patent at col. 4, lines 40-45.) The major axis 315 of the wheelchair region 310 is collinear with the door 106. (The '630 Patent at col. 4, lines 46-47.) To facilitate transfer, the toilet assembly 210 is positioned at a non-zero angle with respect to the wheelchair region 310. (The '603 Patent at col. 4, lines 48-50.) The major axes 215, 315 of the toilet assembly 210 and the wheelchair region are non-parallel, defining an angle 217 between 5.0 and 15.0 degrees. (The '603 Patent at col. 4, lines 57-64.) One or more bars 340 may be provided to support the passenger during transfer. (The '603 Patent at col. 5, lines 56-58.) According to its English abstract, German Patent No. DE 199 13 318 (hereinafter "DE '318") describes a lavatory stall structure (22') for a person in a wheelchair (15). (DE '318 at the English Abstract.) The lavatory stall structure (22') has a lavatory bowl (28') and a washbasin (35) that can be moved within the interior space (21) of the stall (22') in relation to the position of the wheelchair (15). (DE '318 at the English Abstract.) The lavatory bowl (28') can be moved from one side of the stall space (21) to the other and back. (DE '318 at the English Abstract.) The washbasin (35) can be moved around the stall space (21) and is provided with a height adjustment. (DE '318 at the English Abstract.) FIGS. 1-9 illustrate various positioned of the lavatory bowl, the washbasin, and the wheelchair.

From the drawings and the English Abstracts, German Patents Nos. DE 199 13 356 and DE 299 24 487 also appear to address the same design elements that are depicted in DE '318, discussed above. It is noted that, for each of these three patents, the door to the interior space of the lavatory stall structure is curved in its design.

Japanese Patent No. JP 5-155390 (hereinafter "JP '390") describes a lavatory with a toilet room 101, a washing and dressing room 51, and a urinal room 101. (JP '390 at the English Abstract and at FIG. 1.) The three rooms 11, 51, 101 are independent from each other and are disposed adjacent to one another. (JP '390 at the English Abstract.) From FIG. 1 of JP '390, each of the rooms 11, 51, 101 appears to include a window. (See, e.g., JP '390 at FIGS. 1, 3 and 7.)

As should be apparent to those skilled in the art, aircraft may be of any particular size and interior configuration. In larger aircraft, such as those with a two-aisle configuration, there is a larger interior space within the aircraft, which affords a designer a larger number of options when designing the layout for a lavatory.

However, in smaller aircraft, such as the type having a single-aisle configuration, space is at a greater premium, which restricts the designer's choices when designing a layout for handicapped persons, particularly those confined to a wheelchair.

SUMMARY OF THE INVENTION

As a point of reference, the term "handicapped" has fallen into disfavor for a number of reasons. Moreover, the term "handicapped" does not adequately describe those persons for whom the present invention is intended. Accordingly, the discussion that follows does not use the term "handicapped." Instead, the term "Persons with Reduced Mobility" or "PRM" is used in the discussion that follows to refer to those individuals who have reduce mobility and may rely upon one or more apparatuses to facilitate movement. Such apparatuses include wheelchairs, without limitation of the present invention.

The present invention addresses one or more of the deficiencies associated with layouts for lavatories known in the prior art.

In particular, the lavatory design(s) of the present invention is(are) intended to be provided for an aircraft where space is restricted due to the smaller size of the aircraft. Despite space constraints, the lavatory layout of the present invention provides accessibility for persons confined to a wheelchair by improving the positioning of various elements within the lavatory, among other features.

In one embodiment, an aircraft lavatory includes a first wall extending inwardly from a second wall and a third wall extending inwardly from the second wall, the third wall being spaced apart from the first wall by a predetermined distance. A fourth wall connects the first wall to the third wall. The first wall, the second wall, the third wall, and the fourth wall together establish an enclosure encompassing a lavatory area. A countertop is disposed adjacent to the first wall, extending along at least a portion of the first wall. A sink is disposed at a position in the countertop, wherein the countertop defines an under-countertop recess free from obstructions. A toilet is disposed adjacent to both the second wall and the third wall. The toilet defines a toilet area that occupies a portion of the lavatory area. The toilet also defines a toilet axis bisecting the toilet. A door extends along at least a portion of the third wall. When a person in a wheelchair enters the lavatory area along an access axis disposed at an access angle with respect to the toilet axis, the countertop recess accommodates at least a portion of the person's body, thereby permitting the person to transition from the wheelchair to the toilet by shifting the person's body through the access angle.

In one contemplated embodiment, the door extends from a first predetermined position on the third wall to a second predetermined position on the fourth wall such that the door defines an intersection between the third wall and the fourth wall. A line extending substantially perpendicularly to a center point between the first predetermined position and the second predetermined position defines an access axis disposed at an access angle with respect to the toilet axis. When a person in a wheelchair enters the lavatory area along the access axis, the countertop recess accommodates at least a portion of the person's body, thereby permitting the person to transition from the wheelchair to the toilet by shifting the person's body through the access angle.

In one embodiment, it is contemplated that the second wall will be a wall of the fuselage of the aircraft.

It is contemplated that the countertop recess will accommodate at least a portion of the person's legs therein when the person in the wheelchair is positioned at the access angle.

In addition, it is contemplated that the countertop recess is defined in part by a recess wall, a leg space is defined between the recess wall and the toilet, and the leg space accommodates at least a portion of the person's legs therein when the person in the wheelchair is positioned at the access angle.

It is also contemplated that the countertop recess and the leg recess may be positioned in an overlapping relationship.

In an embodiment, the countertop recess accommodates at least a portion of the person's legs therein, when the person in a wheelchair is positioned at the access angle. The access angle may be between about 90° to 180°. Alternatively, the access angle may be about 135°±15°. In another embodiment, the access angle is about 135°±10°. Further, it is contemplated that the access angle may be about 135°±5°. Specifically, it is contemplated that the access angle may be about 135°. In other embodiments, the access angle may be about 120°±15°. Alternatively, the access angle may be about 120°±10°. Still further, the access angle may be about 120°±5°. Specifically, the access angle may be about 120°.

Another aspect of the present invention is that a ratio between the lavatory area and the toilet area is between about 1:4 to 2:5. Alternative, this ratio may be about 1.5:4.5.

For the present invention, it is contemplated that the first wall is substantially parallel to the third wall. Moreover, the fourth wall is substantially perpendicular to the first and third walls.

The door to the lavatory may be L-shaped and define a corner between the third wall and the fourth wall. Alternatively, the door may define a curve extending from the first predetermined position to the second predetermined position.

It is also contemplated that the first wall may be positioned along the second wall such that at least one window in the second wall is positioned between the first wall and the third wall, thereby locating the window within the aircraft lavatory.

To facilitate access by PRM persons, a hand rail may be mounted on the third wall, wherein the hand rail provides a support, graspable by the person, to assist the person to transition from the wheelchair to the toilet.

With respect to other aspects of the present invention, it is contemplated that the lavatory enclosure will be adapted for positioning within an aircraft having a configuration with a single aisle. If so, the fourth wall is contemplated to extend along at least a portion of one side of the aisle.

In the lavatory of the present invention, the toilet is fixed in position within the enclosure. The sink is positioned closer to the fourth wall than the second wall.

In one embodiment, the toilet axis extends substantially perpendicularly to a plane defined by the second wall. In another embodiment, the toilet axis forms an angle with the second wall that is about 45°.

The lavatory of the present invention also seeks to provide a hand grip for a person in wheelchair, where the hand grip is stowable away from a position adjacent to the toilet in the lavatory space.

While hand railings in PRM-accessible lavatories are known in the art, one difficulty with known hand rails is that non-PRM persons using the lavatory may deposit biological materials, specifically urine, on the hand rails, thereby diminishing the sanitary condition of the hand rail.

In the lavatory layout of the present invention, a hand grip is provided that may be adjusted from a stowed position to a deployed position. In the stowed position, the hand grip is less likely to become contaminated with biological fluids, thereby improving the sanitary condition of the lavatory overall.

If included, the hand grip is contemplated to be disposed adjacent to the toilet. The hand grip may be pivotable from a stowed position, where the handgrip is not available to assist a person to transition to the toilet, to a deployed position, where the hand grip is available to assist a person to transition to the toilet.

In one embodiment, the hand grip is pivotally attached to the second wall and pivots vertically from the stowed position to the deployed position.

In another embodiment, when in the stowed position, the hand grip is recessed into the second wall.

The present invention also provides for an aircraft with a single aisle disposed along a longitudinal axis of the aircraft, a first lavatory, and a second lavatory. Both lavatories have a first wall extending inwardly from a second wall and a third wall extending inwardly from the second wall. The third wall is spaced apart from the first wall by a predetermined distance. A fourth wall connects the first wall to the third wall. Together, the first wall, the second wall, the third wall, and the fourth wall establish an enclosure encompassing a lavatory area. A countertop is disposed adjacent to the first wall, extending along at least a portion of the first wall. A sink is disposed at a position in the countertop. The countertop defines an under-countertop recess free from obstructions. A toilet is disposed adjacent to both the second wall and the third wall. The toilet defines a toilet area that occupies a portion of the lavatory area. The toilet defines a toilet axis bisecting the toilet. A door extends along at least a portion of the third wall. When a person in a wheelchair enters the lavatory area along an access axis disposed at an access angle with respect to the toilet axis, the countertop recess accommodates at least a portion of the person's body, thereby permitting the person to transition from the wheelchair to the toilet by shifting the person's body through the access angle.

In one contemplated embodiment of the aircraft according to the present invention, the first lavatory is disposed on one side of the aisle and the second lavatory is disposed on the other side of the aisle.

In another embodiment, the aircraft includes a galley area extending transversely to the aisle, the first lavatory is disposed forward of the galley area, and the second lavatory is disposed rearward of the galley area. The second lavatory, therefore, is disposed adjacent to the galley, at the furthest aft position within the aircraft.

It is contemplated that, for the first lavatory, the door extends from a first predetermined position on the third wall to a second predetermined position on the fourth wall such that the door defines an intersection between the third wall and the fourth wall. A line extends substantially perpendicularly from a center point between the first predetermined position and the second predetermined position and defines the access axis disposed at the access angle with respect to the toilet axis.

For the aircraft of the present invention, for each lavatory, the second wall contemplated to be a wall of the fuselage of the aircraft.

In embodiments of the aircraft, the access angle is contemplated to be between about 90° to 180°. More specifically, for the first lavatory, the access angle is about 135°±15°. Alternatively, for the first lavatory, the access angle is about 135°±10°. Further, for the first lavatory the access angle is about 135°±5°. Most specifically, the access angle is about 135°. In this embodiment, it is contemplated that, for the second lavatory, the access angle is about 120°±15°. More specifically, for the second lavatory, the access angle is about 120°±10°. Even more specifically, for the second lavatory, the access angle is about 120°±5°. Most specifically, for the second lavatory, the access angle is about 120°.

Still further features of the present invention should be appreciated from the drawings appended hereto and from the discussion herein.

BRIEF DESCRIPTION OF THE DRAWINGS

The present invention will now be described in connection with the drawings appended hereto, in which.

DETAILED DESCRIPTION OF EMBODIMENT(S) OF THE INVENTION

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

The various embodiments of the lavatory enclosure of the present invention are discussed in connection with certain space restrictions that are imposed upon designers when placing features within a smaller aircraft, such as encountered within a single-aisle aircraft configuration. While discussed in this context, the present invention should not be understood to be limited to placement in smaller aircraft. To the contrary, the present invention may be employed in aircraft of any size without departing from the scope thereof. Therefore, any discussion of space restrictions that are inherent in smaller aircraft should not be considered to be limiting of the present invention.

The various embodiments of the lavatory enclosure of the present invention also are described in connection with the interior configurations of commercial aircraft. While discussed in this context, the present invention is not intended to be limited to use within commercial aircraft. To the contrary, the lavatory enclosure of the present invention may be employed in any type of aircraft including, but not limited to, private, corporate, and business aircraft. Alternatively, the lavatory enclosure of the present invention also may be employed in other passenger vehicles including, but not limited to, passenger train cars, etc., especially those where space considerations have an impact on lavatory layout parameters.

Figure 1:
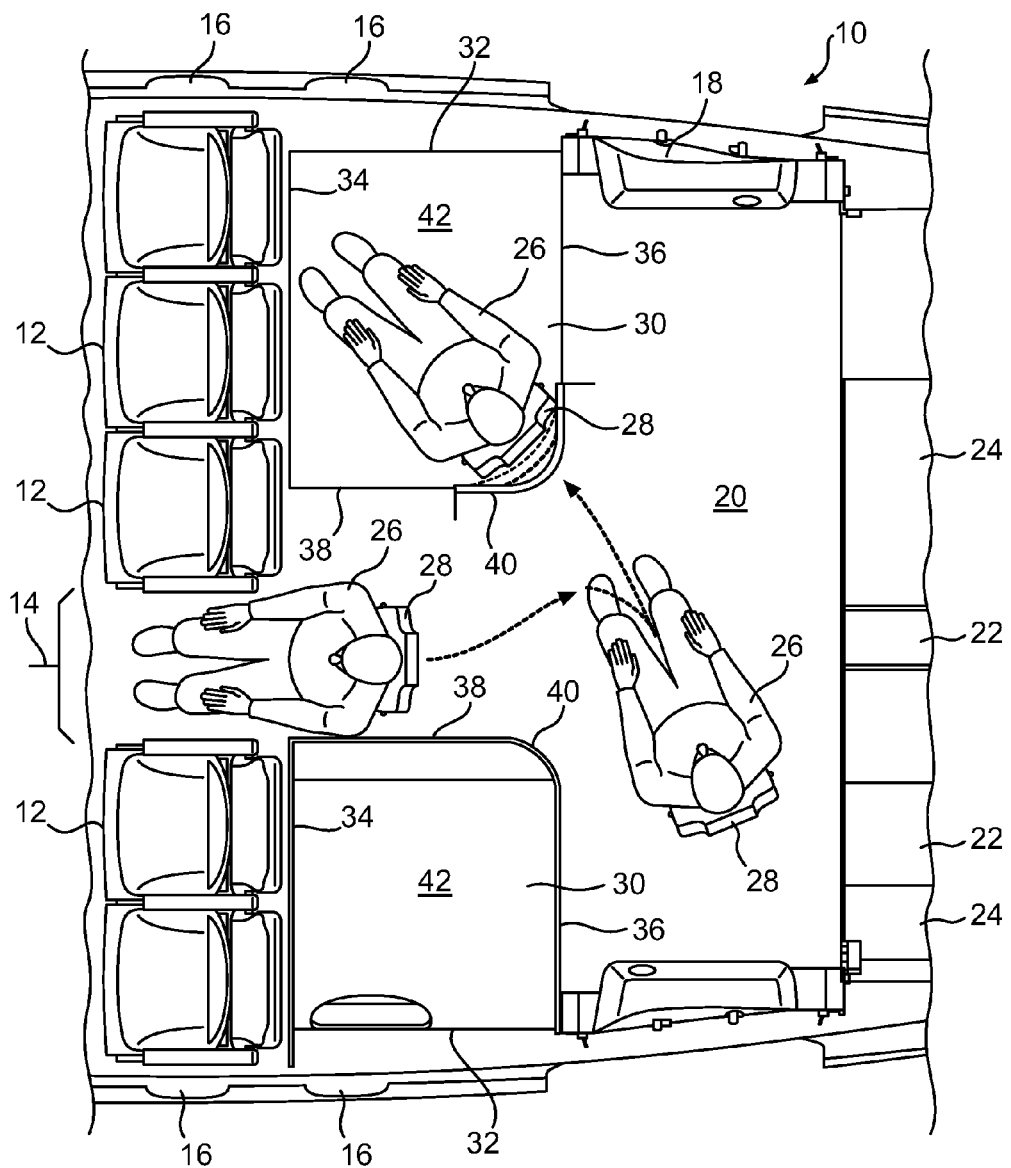
FIG. 1 is a top view of a portion of the interior of an aircraft, indicating one contemplated location for the lavatory enclosure of the present invention.

FIG. 1 is a top view of a portion of an aircraft interior 10. The aircraft interior 10 includes a plurality of passenger seats 12 that are separated by an aisle 14. As a point of reference the aircraft interior 10 includes a plurality of windows 16, exit doors 18, and a galley area 20. The galley area 20 includes is the area in front of the galley, which includes a plurality of cabinets 22 and other work spaces 24 that are typical for most private, commercial, and business aircraft.

With respect to the aircraft interior 10, it is noted that the layout depicted is associated with a smaller aircraft with a single aisle 14. As noted above, while the aircraft interior 10 is shown with a single aisle 14, the present invention may be employed in aircraft with multiple aisles without departing from the scope thereof.

As may be appreciated by those skilled in the art, a person 26 who is confined to a wheelchair typically does not use his or her personal wheelchair in an aircraft, because the widths of the aisles 14 typically are not configured to accept a standard wheelchair. As a result, those persons 26 on an aircraft that are wheelchair-restricted are required to use a wheelchair 28 specifically sized for an aircraft.

In the context of the present invention, therefore, the term wheelchair 28 is intended to refer to the specific wheelchair that is employed within an aircraft rather than a typical wheelchair that would be encountered in situations not on board an aircraft. While the present invention describes an aircraft wheelchair 28, it is noted that the present invention is not intended to be limited solely to embodiments that accommodate an aircraft wheelchair 28. It is contemplated that the present invention may be employed in aircraft that are designed to accommodate any wheelchair type and design, space permitting.

The aircraft interior 10 that is depicted in FIG. 1 includes two lavatory enclosures 30 according to the present invention. The lavatory enclosures 30 are positioned aft of the rear-most passenger seats 12 within the aircraft interior 10. The lavatory enclosures 30 also are positioned across from one another, at either sides of the aisle 14.

It is noted that the positioning of the lavatory enclosures 30 within the aircraft interior 10 are intended to be illustrative of one possible arrangement within an aircraft interior 10. Other configurations are possible, as should be appreciated by those skilled in the art, without departing from the scope of the present invention.

Additionally, while two PRM-accessible lavatory enclosures 30 are illustrated in FIG. 1, it is contemplated that an aircraft interior 10 may include both PRM-accessible lavatory enclosures 30 and non-PRM-accessible lavatory enclosures (as discussed in connection with FIGS. 20-29, below). The present invention, therefore, should not be understood to be restricted to embodiments where only PRM-accessible lavatory enclosures 30 are positioned within the aircraft interior 10, across the aisle 14 from one another.

Additionally, while the lavatory enclosure 30 of the present invention is contemplated, at least in one embodiment, to be positioned at one side of an aircraft interior 10, it is contemplated that the lavatory enclosure 30 may be placed at any other location within the aircraft interior 10 without departing from the scope of the present invention. For example, the lavatory enclosure may be positioned at the rear of the aircraft, rearward of the galley area 20, in the location including the cabinets 22 and the work spaces 24, such as the embodiment described in connection with FIGS. 20-29. In still another contemplated variation, the lavatory enclosure 30 may be placed in a central position within the aircraft interior 10, at a location not adjacent to a fuselage wall, for example.

With continued reference to FIG. 1, the lavatory enclosure 30 is defined by four walls. The four walls are the fuselage wall 32, a fore wall 34, an aft wall 36, and an interior wall 38. A door 40 provides access to the interior of the lavatory enclosure 30. The interior space of the lavatory enclosure 30 is referred to herein as the lavatory area 42.

While the lavatory enclosure 30 is discussed in connection with the orientation shown in FIG. 1, the naming convention for the walls is intended merely to provide a context understandable with respect to the aircraft interior 10 illustrated in FIG. 1. As should be immediately apparent, the naming convention for the walls is not intended to be limiting of the present invention. Moreover the placement of the amenities within the lavatory enclosure 30 may be changed to accommodate the placement of the lavatory enclosure 30 within an aircraft interior 10. It is also noted that the orientation of the lavatory enclosure 30 may be changed without departing from the scope of the present invention.

Figure 2:
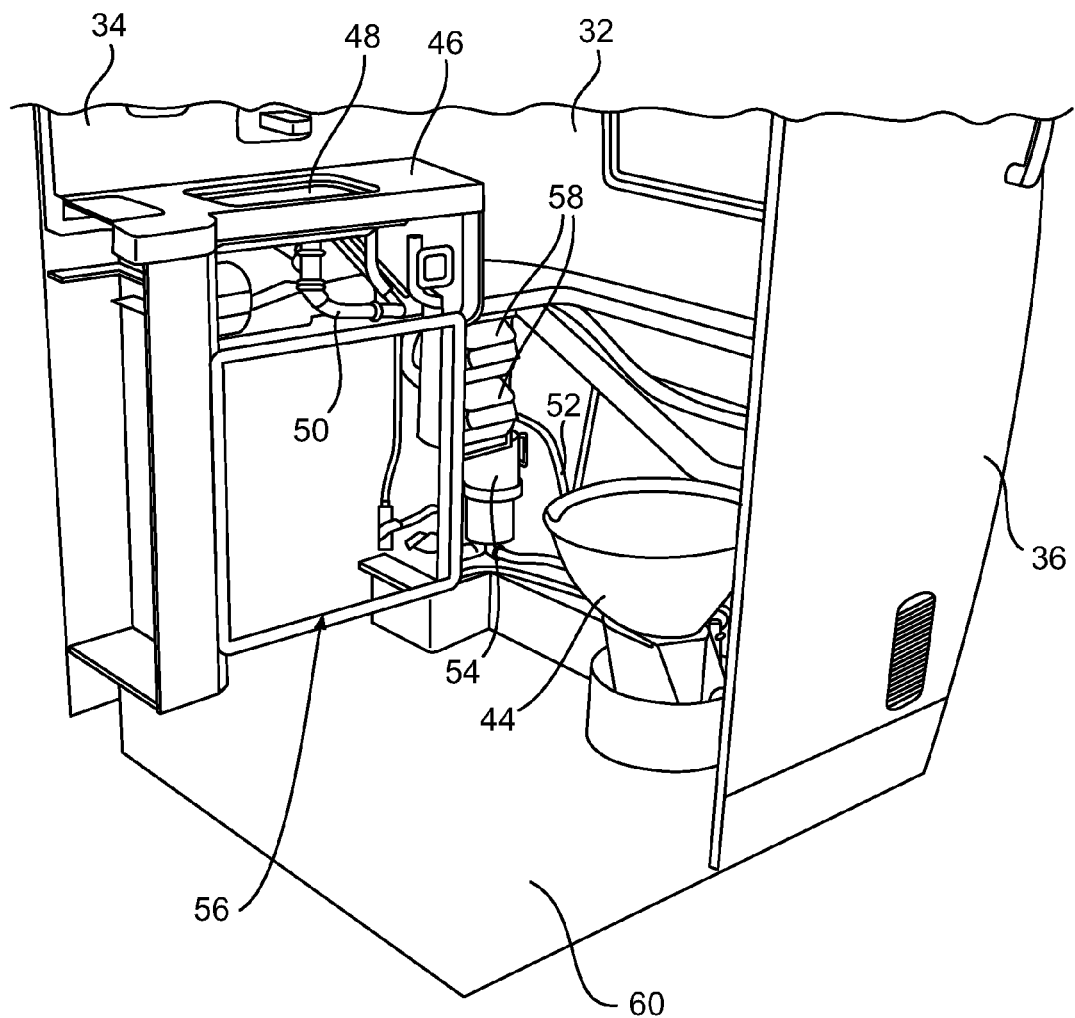
FIG. 2 is a perspective illustration of a portion of a lavatory enclosure according to the present invention, highlighting a countertop recess beneath the countertop within the lavatory enclosure.

FIG. 2 is a perspective illustration of a portion of the interior of the lavatory enclosure 30 of the present invention. Certain amenities within the lavatory enclosure 30 are depicted. As will become apparent from the discussion that follows, and as should be apparent from the various illustrations appended hereto, this particular configuration is not intended to be limiting of the present invention.

The lavatory enclosure 30 includes a toilet 44, a countertop 46, and a sink 48. Also shown in FIG. 2 are various components that are necessary for operation of the lavatory enclosure 30. For example, the sink 48 includes associated piping 50 to conduct water to the sink 48 and remove waste water therefrom. Similarly, the toilet 44 has piping 52 associated with it to provide water and remove waste products. One or more pumps 54 may be positioned beneath the countertop 46 to assist with removal of waste from the toilet 44 and/or sink 48.

With respect to FIG. 2, one aspect of the layout for the lavatory enclosure 30 of the present invention is a countertop recess 56 that is defined underneath the countertop 46. This countertop recess 56 defines a countertop recess area and volume beneath the countertop 46. As will be discussed in connection with the remaining figures of the drawings, the countertop recess 56 is positioned and designed to accommodate at least a portion of the person 26 therein. Specifically, the countertop recess 56 is positioned to receive a portion of the legs of the person 26 in the wheelchair 28. As also illustrated in this figure, two toilet paper holders 58 are positioned beneath the countertop 46, adjacent to the toilet 44. For reference, the floor 60 of the lavatory enclosure 30 also is designated.

Figure 3:
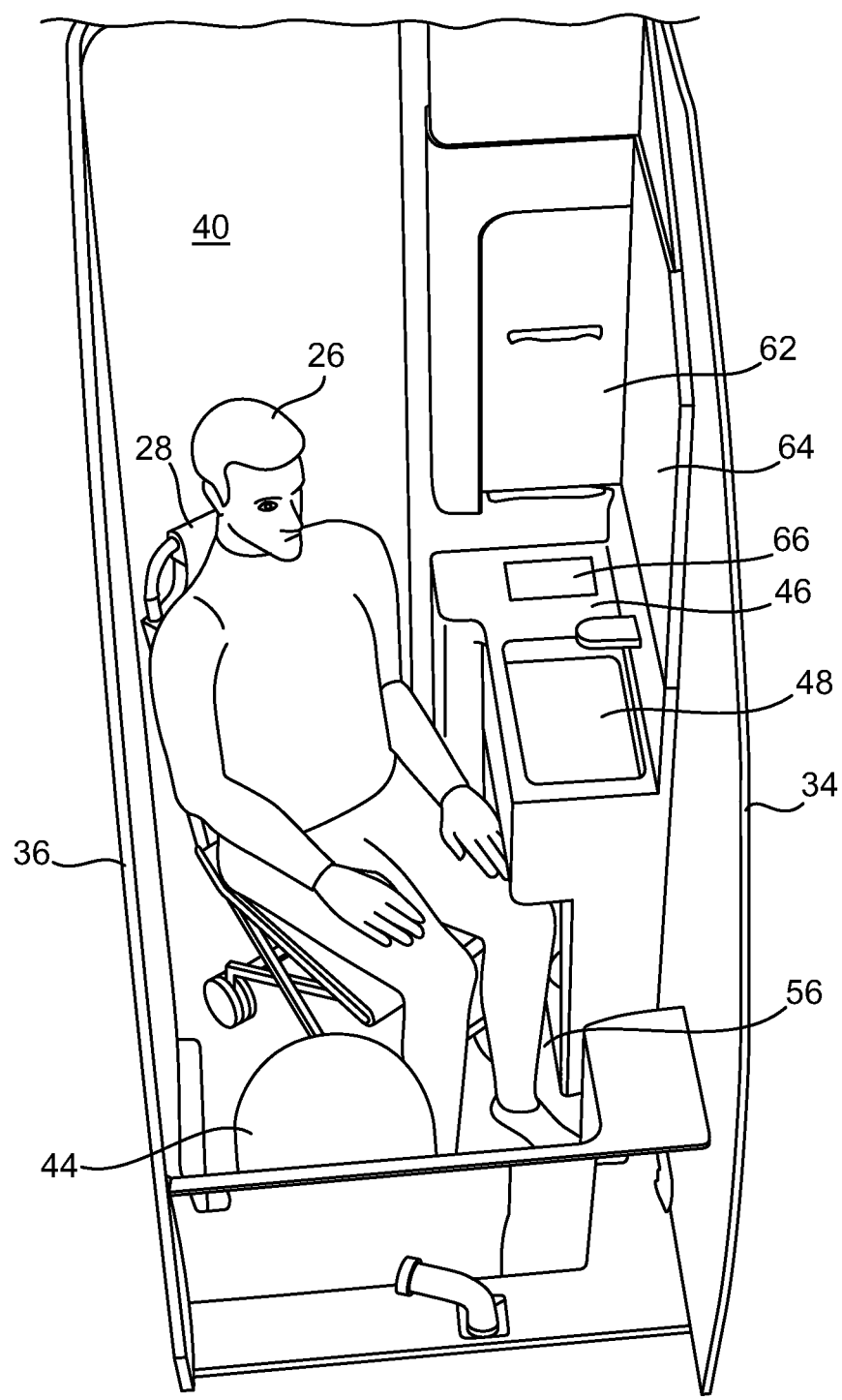
FIG. 3 is a perspective illustration of the layout for the lavatory enclosure of the present invention depicted in FIGS. 1 and 2, also illustrating a person in a wheelchair in the lavatory space.

FIG. 3 is a perspective view of the lavatory enclosure 30 depicted in FIGS. 1 and 2. The perspective view is taken from a position at or near the fuselage wall 32. The person 26 is shown in a position where the person 26 accessed the lavatory enclosure 30 via the door 40. It is noted that, with the lavatory enclosure 30 of the present invention, the person 26 may access the lavatory enclosure 30 in a face-forward orientation.

As may be apparent to those skilled in the art, many prior art embodiments of lavatories require that the person 26 access the lavatory by backing into the lavatory. In such embodiments, this is required due to space restraints. As may be apparent, while backing into a lavatory is acceptable, the person 26 typically would prefer a face-forward access, as is provided by the design of the present invention. Therefore, one advantageous feature of the present invention is a layout for a lavatory enclosure 30 that permits face-forward access by a person 26 in a wheelchair 28.

Returning to FIG. 3, in this embodiment, the toilet 44 is positioned adjacent to the fuselage wall 32, against the fuselage wall 32. As is also apparent from this illustration, the toilet 44 is positioned closer to the aft wall 36 than to the fore wall 34. In this drawing, the relative positions of the countertop 46 and the sink 48 also are depicted. For reference, this view includes other amenities typically found in an aircraft lavatory including a cabinet 62, a mirror 64, and a waste bin 66. The countertop recess 56 also is designated for ease of reference.

Figure 4:
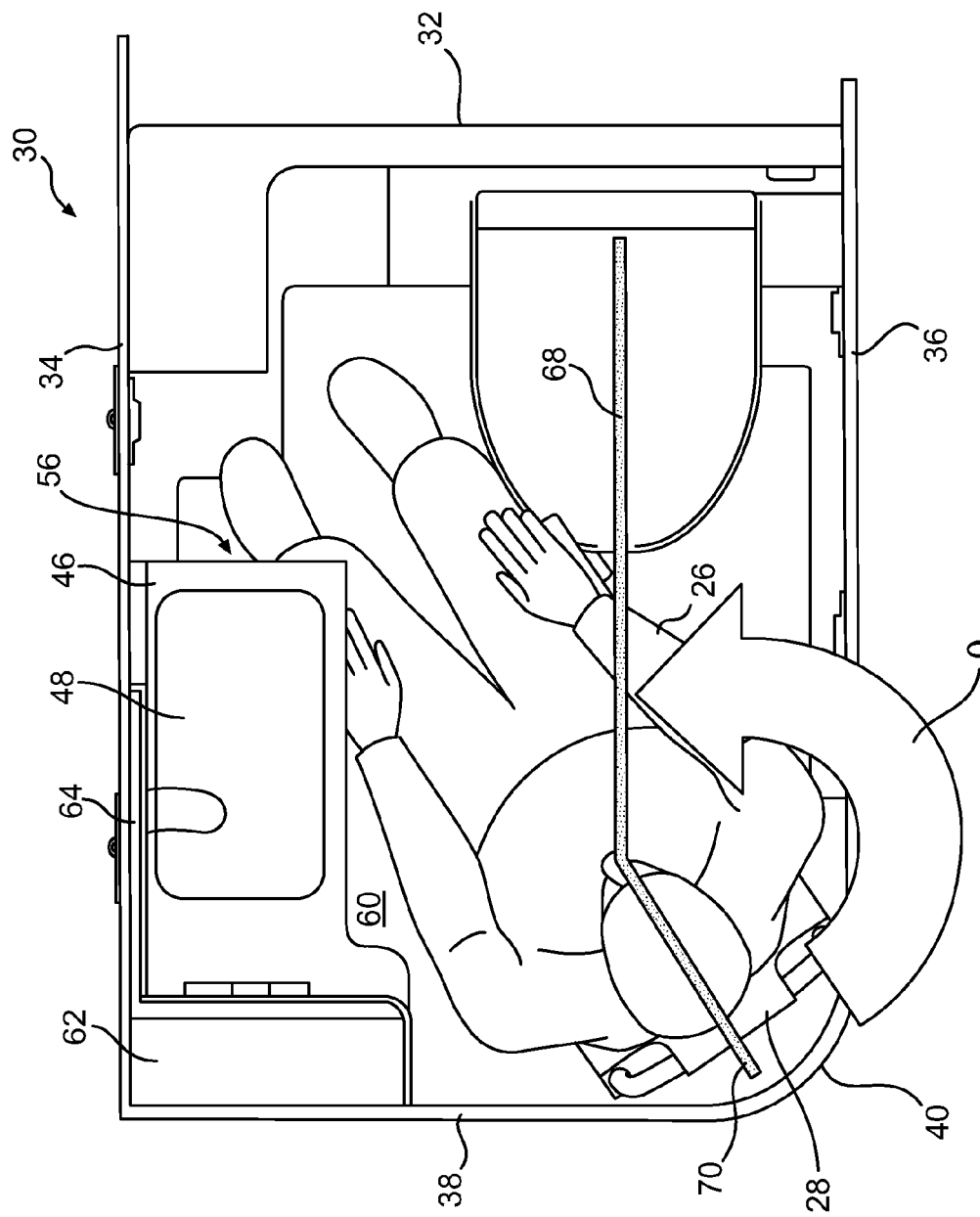
FIG. 4 is a top view of the embodiment of the layout for the lavatory enclosure depicted in FIG. 3, illustrating the relative positioning of a person in a wheelchair with respect to the amenities provided within lavatory enclosure.

FIG. 4 is a top view of the lavatory enclosure depicted in FIGS. 1-3. This top view depicts the relationship between the various amenities within the lavatory enclosure 30. This view also illustrates how a $95^{th}$-percentile male 26, seated in a wheelchair 28, is anticipated to appear when fully positioned within the lavatory enclosure 30, after closing the door 40.

Before continuing with a discussion of the present invention, it is noted that the design parameters of the present invention were created, taking into account a $95^{th}$-percentile male. A $95^{th}$-percentile male is a male person 26 that meets the physical characteristics of an average male within the $95^{th}$ percentile of the human population, with respect to physical dimensions. The $95^{th}$-percentile male, therefore, is a mathematical construct that is employed by designers, as should be apparent to those skilled in the art. Since this construct is a known design tool, a definition of the construct is not provided herein.

In connection with the $95^{th}$-percentile male, reference is made to col. 5, lines 24-26, of the '603 Patent discussed above. The '603 Patent refers to a publication by Henry Dreyfuss Associates, entitled "The Measure of Man & Woman: Human Factors in Design" (2001). That publication (including subsequent editions) is incorporated herein by reference to provide support for any body type, including the $95^{th}$-percentile male discussed herein. This definition is not intended to be limiting of the present invention, as the design standards are understood to change over time. However, this publication provides a convenient reference for those wishing to comprehend design parameters associated with (or in reference to) the human body.

With continued reference to FIG. 4, the door 40 to the lavatory enclosure 30 is positioned at an offset location. Specifically, the door 40 is positioned at the intersection between the aft wall 36 and the interior wall 38. Therefore, the position of the door 40 permits the person 26 in the wheelchair 28 to access the lavatory enclosure 30 at an angle θ with respect to an axis 68 of the toilet 44. With respect to this illustration, the person 26 in the wheelchair 28 defines an axis 70 that is consistent with a forward-facing direction of the person 26 in the wheelchair 28.

Figure 5:
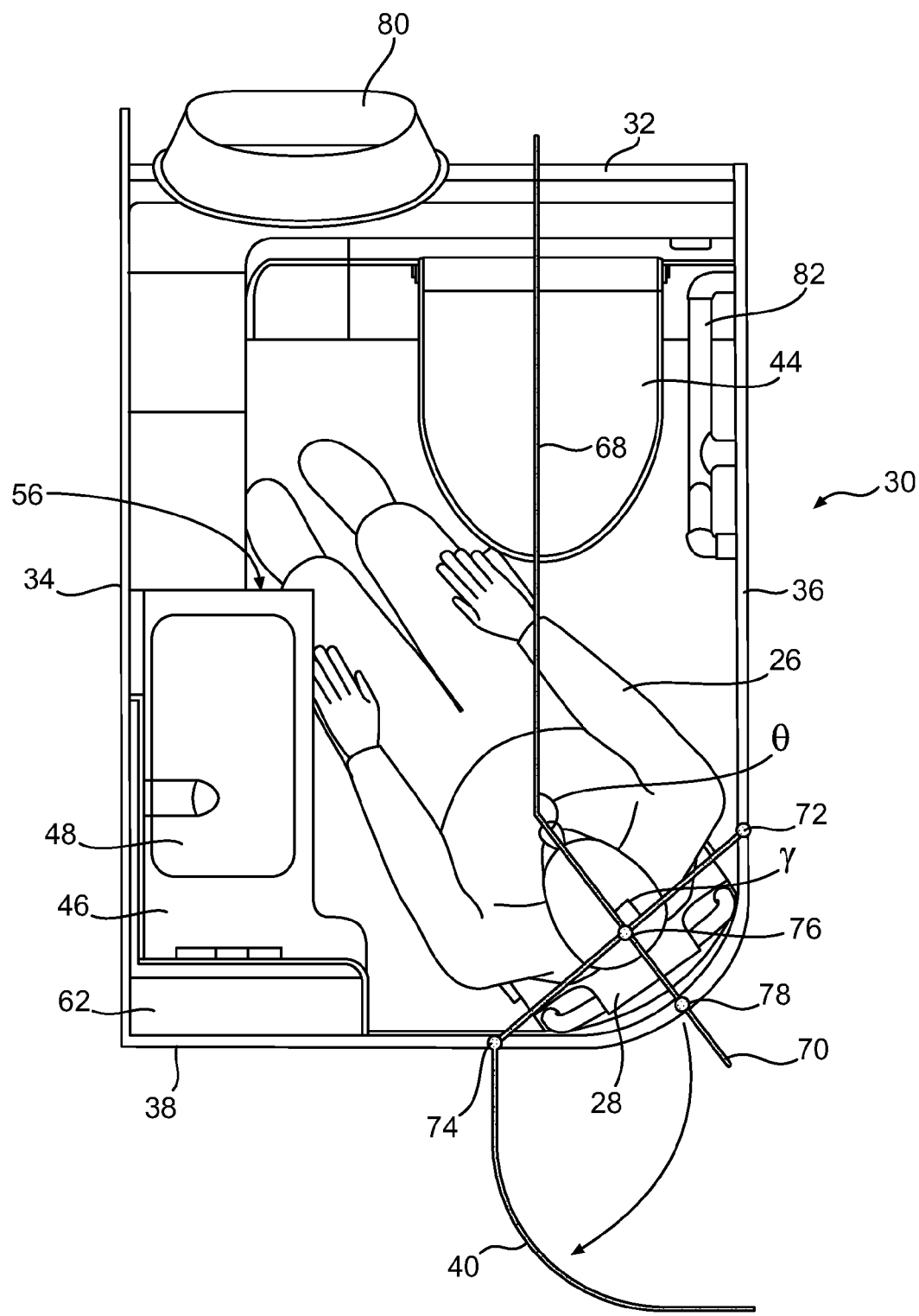
FIG. 5 is a top view of the embodiment of the layout for the lavatory enclosure depicted in FIGS. 3 and 4, showing a curved door.

With reference to FIG. 5, and in connection with the discussion of the present invention, the axis defined by the toilet is referred to as the toilet axis 68. The axis defined by the person 26 in the wheelchair 28 is referred to as the access axis 70. The toilet axis 68 is measured as substantially the axis bisecting the lateral sides of the toilet 44 and extending along the major direction of the toilet 44. The access axis 70 may be defined according to the door 40 into the lavatory enclosure 30. Specifically, the door 40 connects to the aft wall 36 at a first point 72. The door 40 connects to the interior wall 38 at a second point 74. The access axis 70, therefore, is defined by a line extending from a point 76 bisecting a line connecting the first point 72 and the second point 74. The access axis 70 is substantially perpendicular to the line connecting the first point 72 to the second point 74. In the illustrated embodiment, the access axis 70 also is defined by a center point 78 of the door 40.

It is noted that the access axis 70 need not be substantially perpendicular to the line connecting the first point 72 to the second point 74. While a 90° angle is illustrated, the angle may be any magnitude of the angle γ that may be suitable for the interior 10 of the aircraft. Any suitable value for γ may be employed without departing from the scope of the present invention.

In the embodiment illustrated in FIG. 5, at least two additional features of the lavatory enclosure 30 are illustrated. First, the lavatory enclosure 30 includes a window 80. Second, a hand rail 82 is provided on the interior surface of the aft wall 36 to provide assistance to the person 26 when transitioning from the wheelchair 28 to the toilet 44. As in prior illustrated embodiments, the door 40 is shown as a curved door 40. While the door 40 is shown as being hingedly connected to the interior wall 38, it is contemplated that the door 40 may be hingedly connected to the aft wall 36 without departing from the scope of the present invention.

Figure 6:
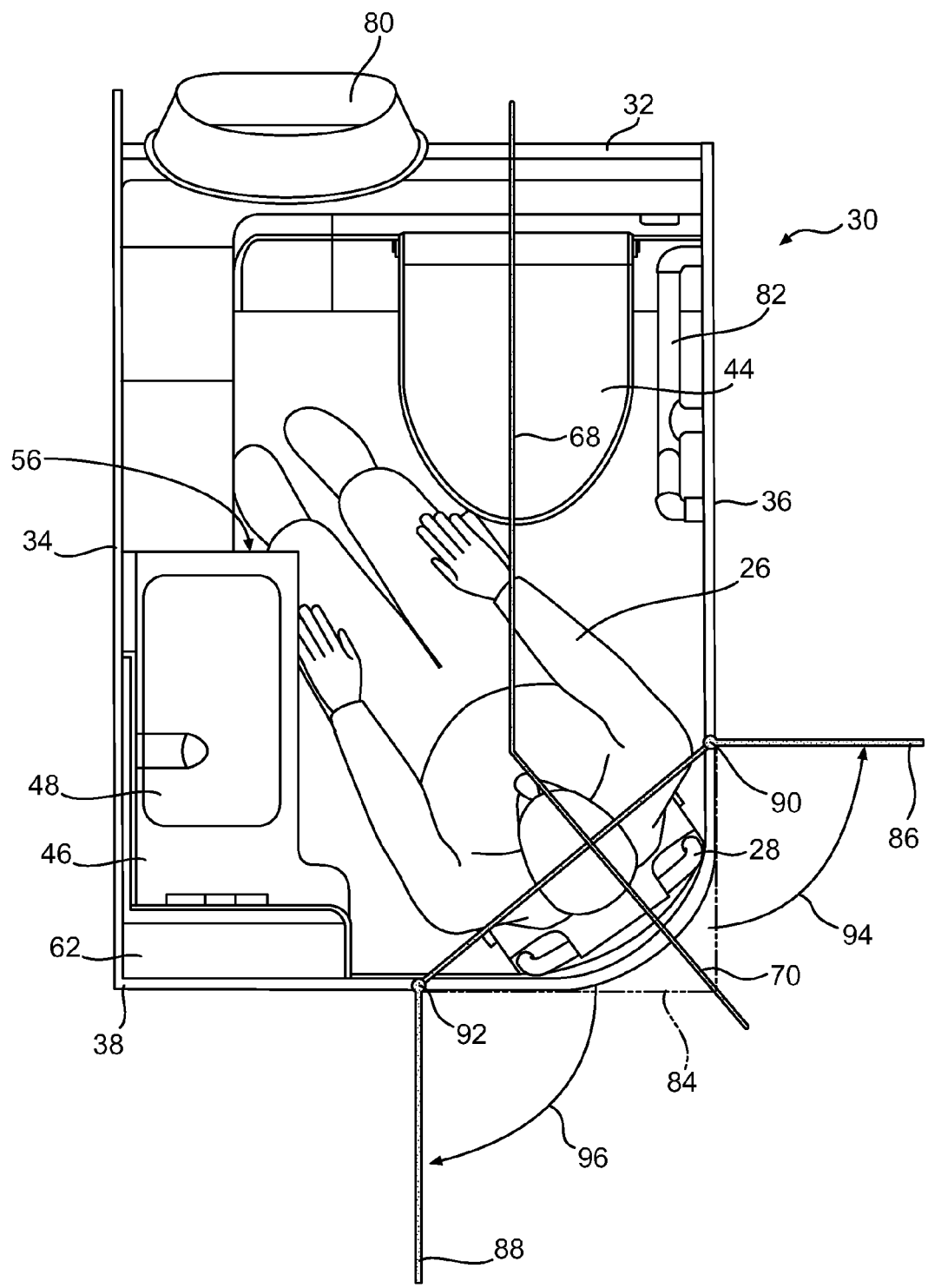
FIG. 6 is a top view of the contemplated embodiment for the layout of the lavatory enclosure of the present invention depicted in FIG. 5, illustrating a variation where the door includes separate panels that may be opened to provide access to the interior of the lavatory enclosure.

FIG. 6 is a top view of the lavatory enclosure 30 that illustrates a variation of the embodiment shown in FIG. 5. Here, the door 84 comprises two separate door panels, an aft door panel 86 and an interior door panel 88. The aft door panel 86 is hingedly connected to the aft wall 36 at a first hinge point 90. The interior door panel 88 is hingedly connected to the interior wall 38 at a second hinge point 92. As illustrated, the aft door panel 86 opens along a first arc 94. Similarly, the interior door panel 88 opens along a second arc 96.

With continued reference to FIG. 6, the door 84 is anticipated to function in one of two different modes. In a first mode, when the lavatory enclosure 30 is accessed by a non-PRM person, the non-PRM person typically will open only one of either the interior door panel 88 or the aft door panel 86. As such, a non-PRM person will open the door 84 in a conventional manner. In the second mode, which is associated with access by a PRM person 26, both the aft door panel 86 and the interior door panel 88 are opened to provide an opening of sufficient width so that the wheelchair 28 can enter the lavatory enclosure 30. As illustrated, when both the aft door panel 86 and the interior door panel 88 are opened, the person 26 in the wheelchair 28 can enter the lavatory enclosure 30 along the access axis 70.

Concerning the access axis 70, it is contemplated that the access angle θ will be more than 90° but less than 180°. In the illustrated embodiment, the access angle θ is 135°. However, other variations are contemplated to fall within the scope of the present invention. For example, the access angle θ may be between about 120° and 150°. Alternatively still, the access angle θ may be between about 125° to 145°. In addition, the access angle θ may be between about 130° to 140°. Other variations should be apparent to those skilled in the art.

One reason that an access angle θ of 135° has been selected for the present invention is that the access angle θ also defines the angle through which the person 26 must transition his or her body when transitioning from the wheelchair 28 to the toilet 44. Since this angle is less than 180°, the person 26 will require diminished effort to make the transition through the access angle θ from the wheelchair 28 to the toilet.

Figure 7:
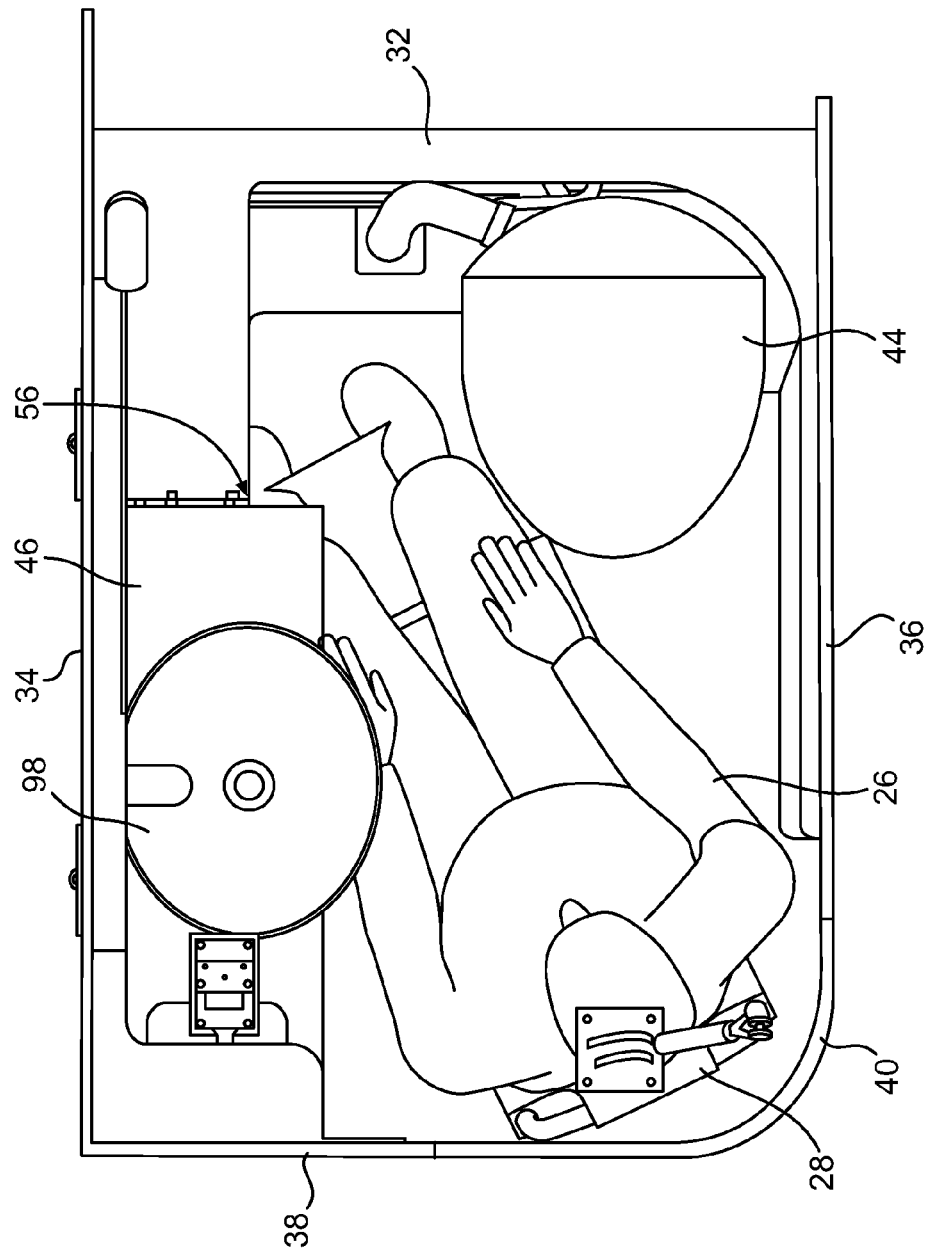
FIG. 7 is a top view of another contemplated layout for the lavatory enclosure of the present invention, the view also showing a person in a wheelchair to assist with an understanding of the relative positioning of the features associated with this embodiment of the present invention.

FIG. 7 illustrates another contemplated embodiment of the lavatory enclosure 30 of the present invention. Here, the sink 98 is a circular (or oval) sink, instead of the rectangular-shaped sink 48 depicted in prior embodiments. As should be apparent, the sink 98 may have any suitable shape without departing from the scope of the present invention.

Figure 8:
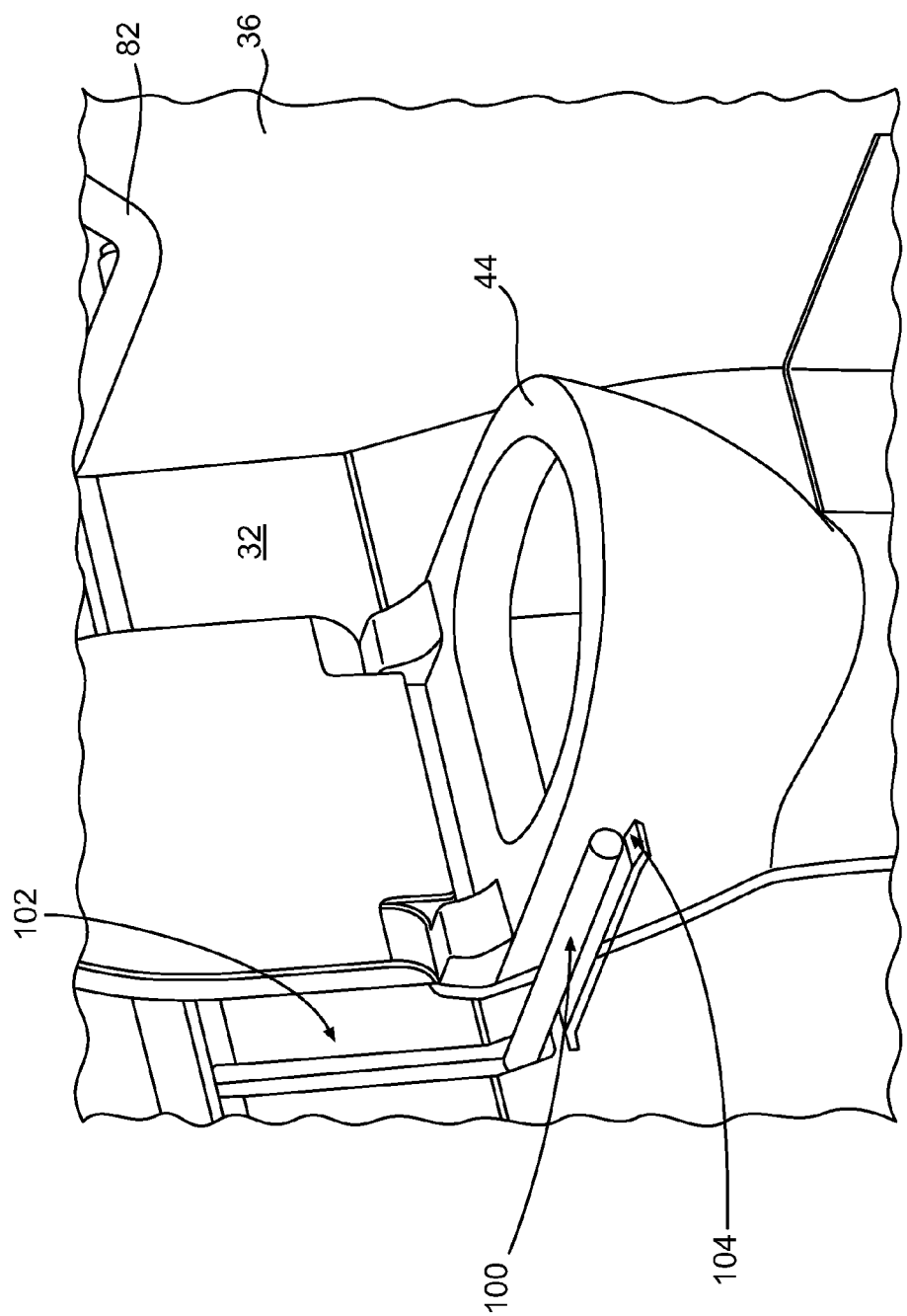
FIG. 8 is a perspective illustration of a toilet with an adjacent, stowable hand grip according to the present invention, the hand grip being shown in the deployed position.

FIG. 8 is a perspective view of a portion of the lavatory enclosure of the present invention detailing a further aspect of the present invention, a stowable hand grip 100. The hand grip 100 is illustrated in the deployed position. As should be apparent, the hand grip 100 may be provided to help the person 26 transition to the toilet 44 without having to rely on the toilet itself for physical support. In other words, the hand grip 100 provides a more sanitary support area for the person 26 transitioning to the toilet 44.

The hand grip 100 is attached to the fuselage wall 32 in a pivotable manner such that the hand grip 100 may be transitioned from the deployed position to a stowed position, essentially parallel to the fuselage wall 32. In FIG. 8, a recess 102 is provided in the fuselage wall 32 to receive the hand grip 100 when in the stowed position. FIG. 8 also illustrates a ledge 104 that extends outwardly from the toilet 44. The handgrip 100 is disposed a distance from the ledge 104 when in the deployed position, as illustrated.

Figure 9:
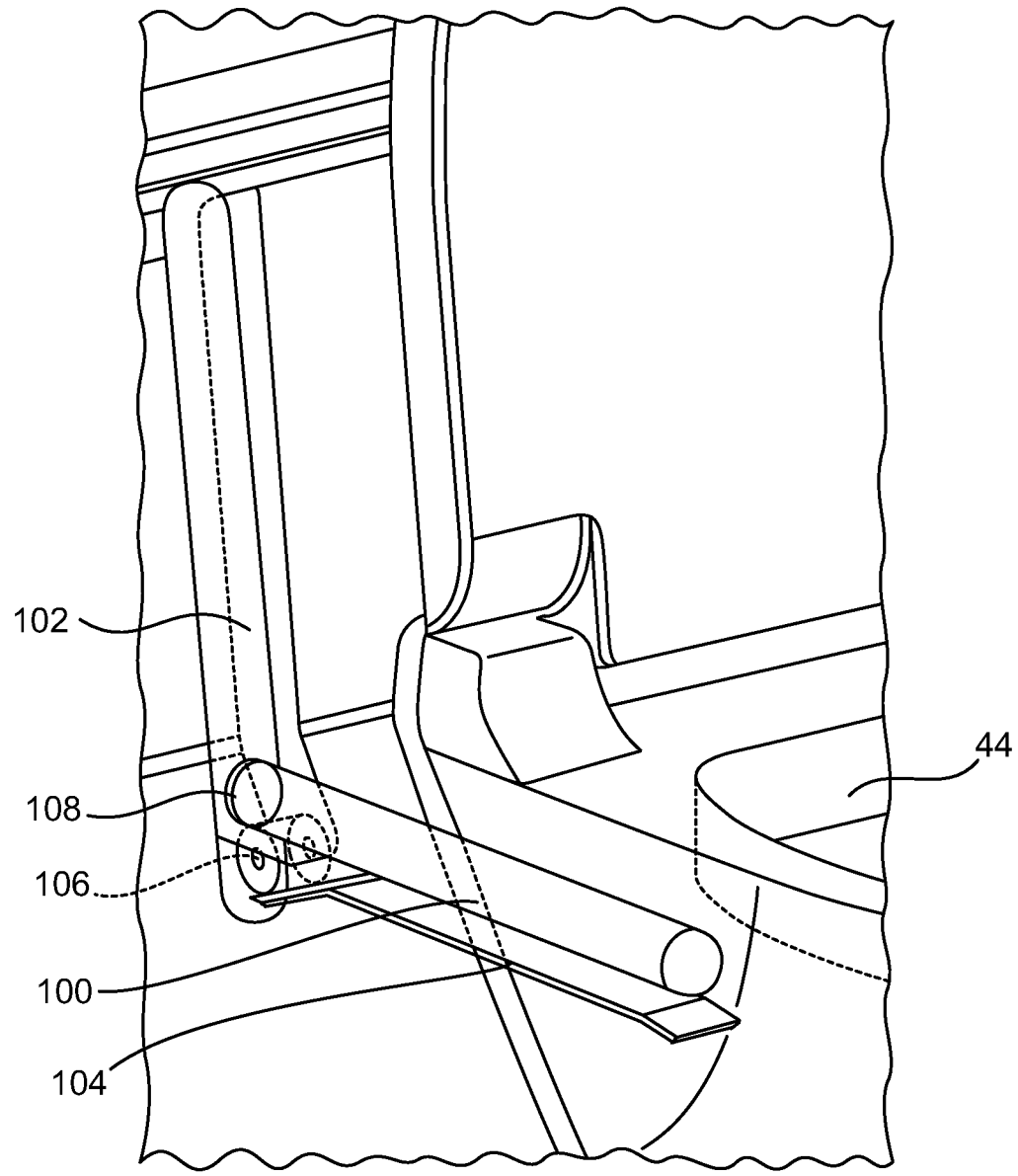
FIG. 9 is a perspective detail of the hand grip shown in FIG. 8, the hand grip being depicted in the deployed position.

FIG. 9 is an enlarged detail of the hand grip 100 illustrated in FIG. 8. The hand grip 100, recess 102, and ledge 104 are clearly visible in this illustration. Here, the position of a hinge 106 is provided. The hinge 106 is offset from the rear end 108 of the hand grip 100, which permits the hand grip 100 to be fully received into the recess 102 when in the stowed position.

With respect to the hand grip 100 depicted in FIGS. 8 and 9, it is noted that the recess 102 need not be provided to practice the present invention. In one contemplated variation, the hand grip 100 may be stowed in a position adjacent to the fuselage wall 32 without being recessed thereinto.

In another contemplated embodiment, it is contemplated that the hand grip 100 is not hingedly mounted to the fuselage wall 32. Instead, in this embodiment, the hand grip 100 is contemplated to be available for use at all times. Specifically, the hand grip 100 is immovably mounted to the fuselage wall 32.

As illustrated in FIGS. 8 and 9, the hand grip 100 is contemplated to be disposed at approximately the height of the toilet 44. This positioning is intentional as it is understood to provide the person 26 in the wheelchair 28 with suitable leverage to transition from the wheelchair 28 to the toilet 44. It is contemplated that the hand grip 100 will be 2-3 inches (5.08-7.62 cm) from the edge of the toilet, which allows the person 26 to distribute his or her weight onto the hand grip 100 at a point near to the toilet 44.

While not critical to the operation of the hand grip 100, it is contemplated that the hand grip 100 will have a diameter of 1.1-1.5 inches (2.80-3.81 cm). In addition, the hand grip 100 should extend a sufficient distance from the fuselage wall 32 to provide a sufficient length for grasping by the person 26. A length of 8.5-9 inches (21.60-22.90 cm) is considered to be suitable for this purpose.

In the embodiment where the hand grip 100 is stowable, it is contemplated that the hand grip 100 will have a release and/or locking mechanism associated with its operation. For example, a release button (not shown) may be located at the end of the hand grip 100 to facilitate locking and unlocking of the hand grip 100. In this embodiment, while it is contemplated that the hand grip 100 will be lockable in the fully deployed and the fully stowed positions, the hand grip 100 may be lockable in any angular position therebetween without departing from the scope of the present invention.

Figure 10:
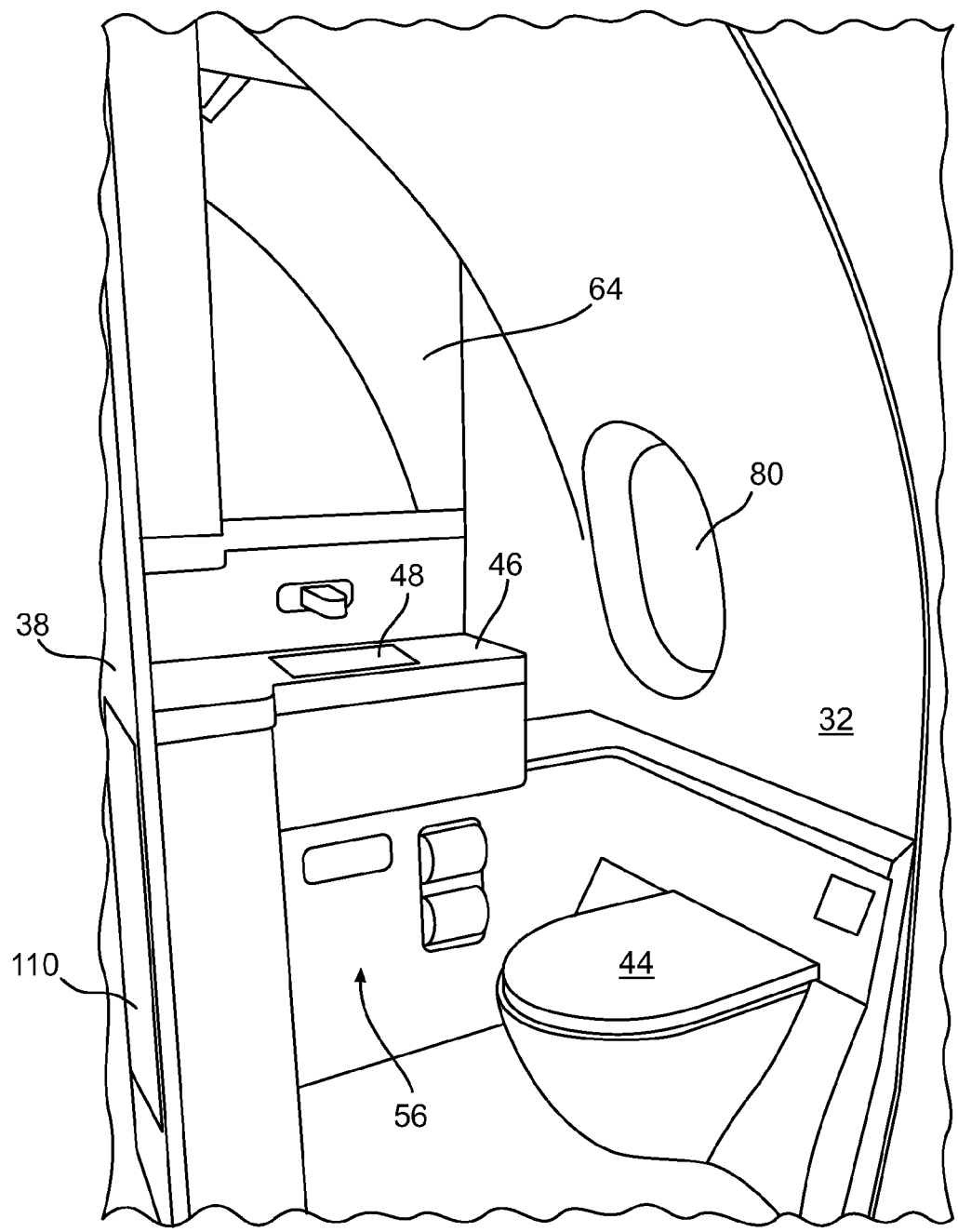
FIG. 10 is a perspective illustration of one contemplated embodiment of the interior space of the lavatory enclosure of the present invention, providing greater detail concerning a finished appearance of a lavatory according to the present invention.

FIG. 10 is a perspective illustration of the finished appearance of the embodiment of the lavatory enclosure depicted, inter alia, in FIG. 1. The relative positions of the toilet 44, the countertop 46, the sink 48, the mirror 64, the window 80, and the countertop recess 56 are readily discernible in this perspective view. Also depicted is a waste bin servicing area 110, which permits a flight attendant to empty the trash in the lavatory enclosure 30 without having to enter the lavatory area. The waste bin servicing area 110 is provided, as a door, through the interior wall 38.

Figure 11:
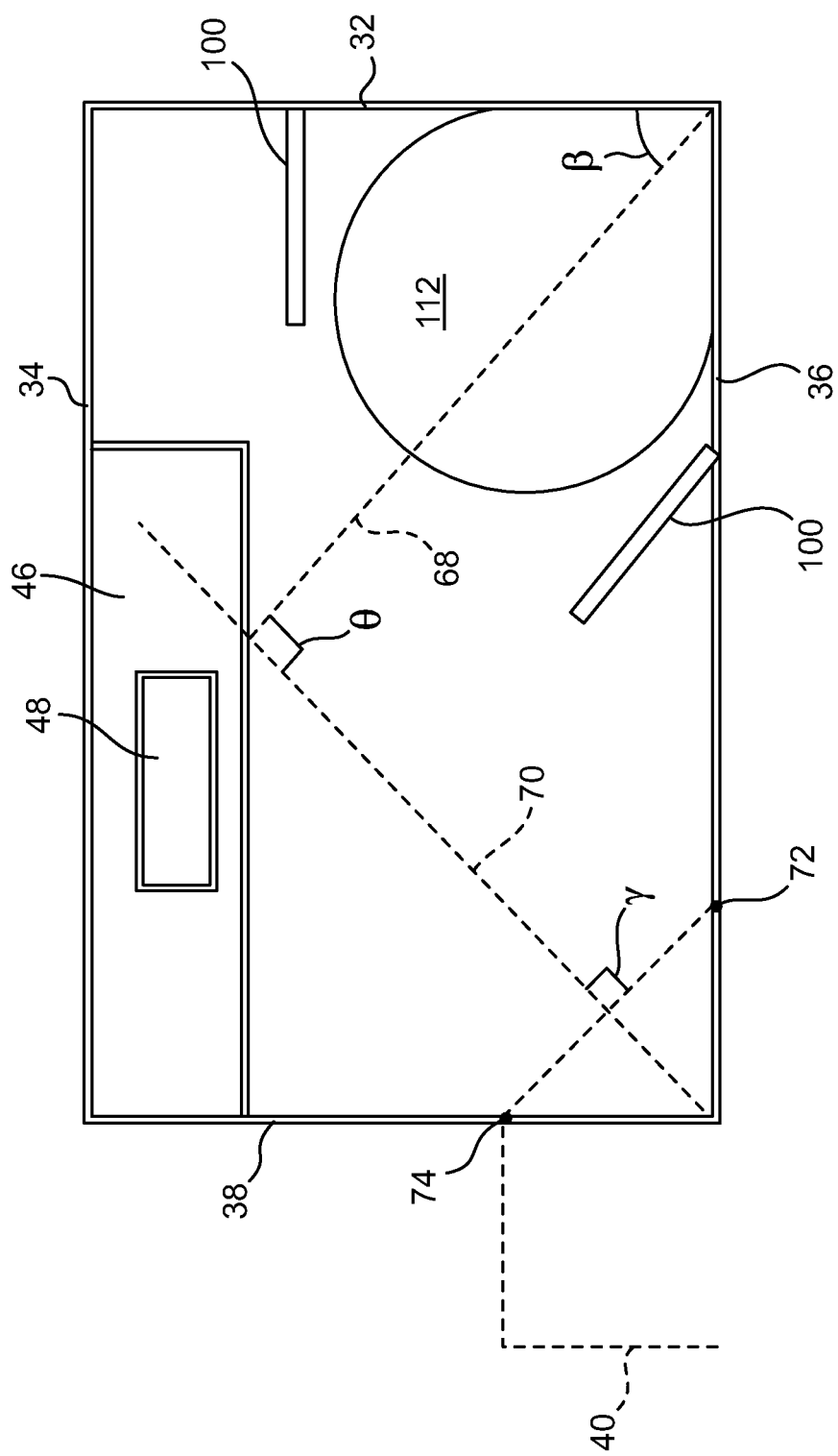
FIG. 11 is a top, schematic illustration of another contemplated embodiment of the lavatory enclosure of the present invention, showing an alternative orientation for the toilet.

FIG. 11 is a top, schematic view of another embodiment of the lavatory enclosure 30 of the present invention.

In this embodiment, the toilet 112 is positioned at a corner of the lavatory enclosure 30 defined by the intersection of the aft wall 26 and the fuselage wall 32. The major axis 68 of the toilet 112 is angled, at angle β, with respect to the fuselage wall 32. In the illustrated embodiment, the angle β is about 45°. It is noted that the angle β need not be 45°. A larger or a smaller angle may be employed without departing from the present invention. It is noted, however, that the angle β is likely to be selected between 45° and 90°. As should be apparent, for the embodiment of the invention discussed in connection with FIG. 1, the angle β is about 90°.

FIG. 11 also illustrates the access angle θ. With the toilet 112 disposed at about 45° with respect to the fuselage wall 32, the access angle θ is about 90°, as illustrated. Naturally, the access angle θ may be varied from 90° without departing from the scope of the present invention. As noted above, it is contemplated that the access angle will be between about 90° and 135°. It is noted that the lower limit may be more than 80° to accommodate additional variations. More specifically, the lower limit for the access angle may be about 85°.

FIG. 11 also illustrates another variation of the lavatory enclosure 30 of the present invention. Here, the hand grip 100 is illustrated in two positions. The first position is on the fuselage wall 32, as previously discussed. The second position is on the aft wall 36. While the second position is on the aft wall 36, it is contemplated that a standard handrail 82 will be disposed on this wall rather than a hand grip 100.

Figure 12:
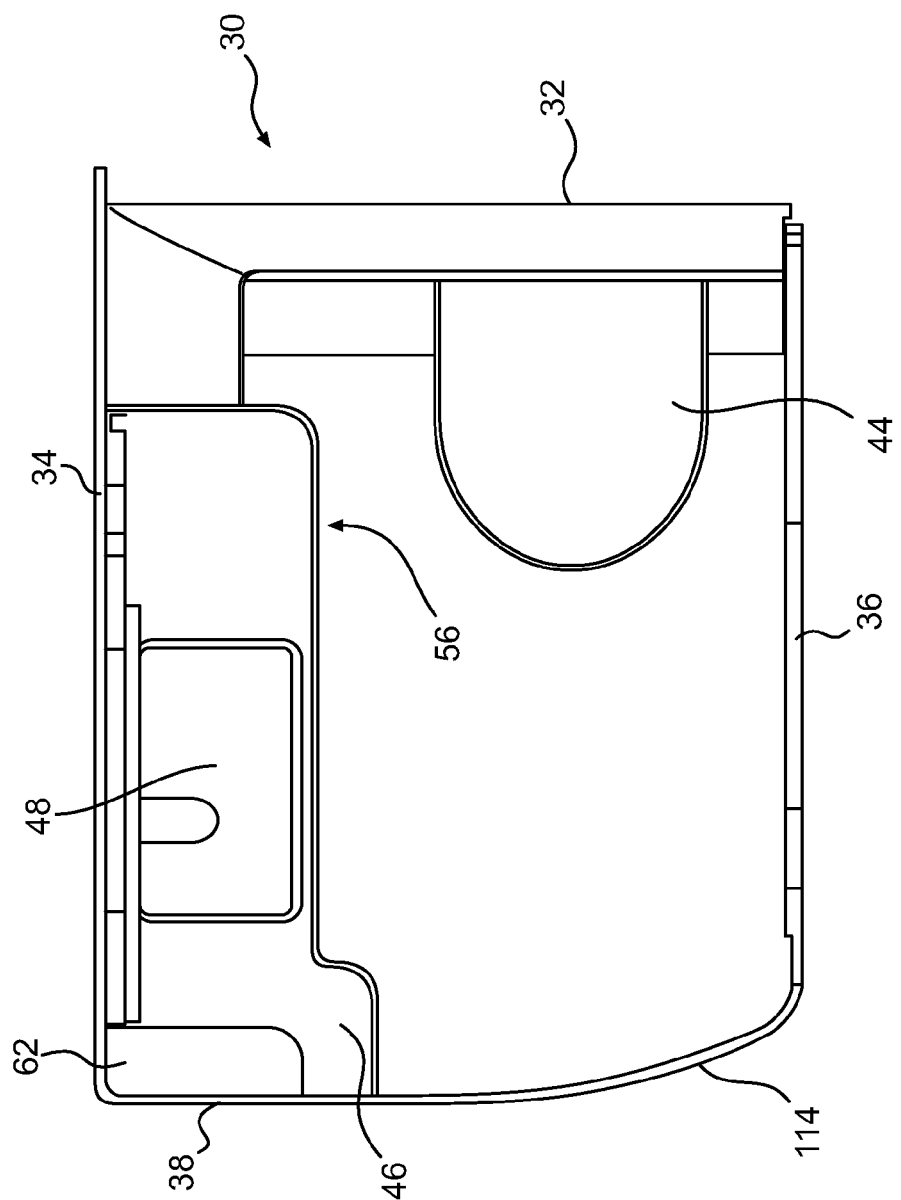
FIG. 12 is a top view of a further embodiment contemplated for the lavatory enclosure of the present invention.

FIG. 12 is a top view of still another embodiment of the lavatory enclosure 30 of the present invention. The features of this embodiment are, for the most part, the same as the embodiment illustrated in FIG. 1, for example. However, in this illustration, the door 114 is shown with a more rectilinear shape than the curved door 40 previously described.

Figure 13:
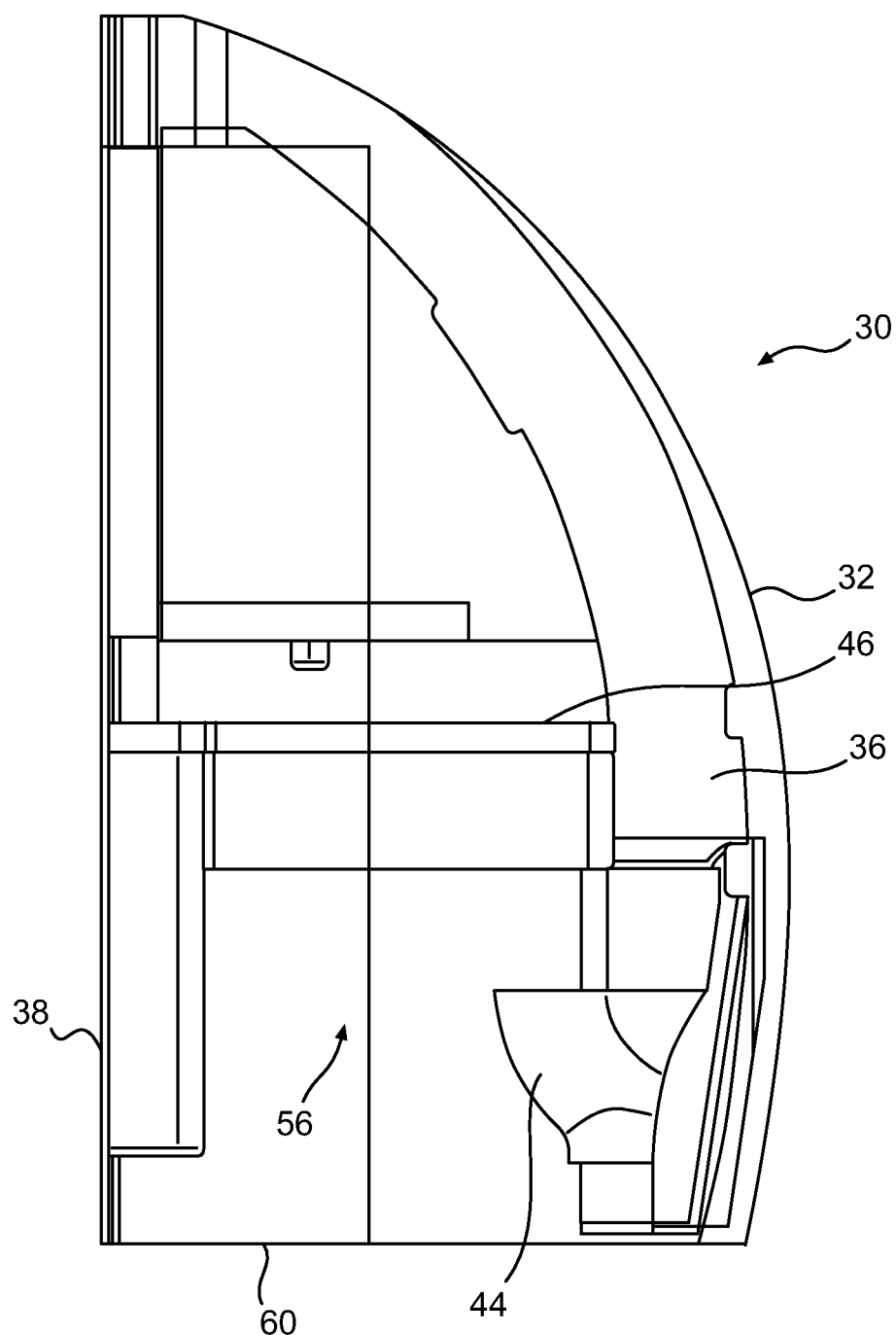
FIG. 13 is a side view of the lavatory enclosure shown in FIG. 12, taken from the vantage point of a person standing aft of the lavatory enclosure, facing the front of the aircraft.

FIG. 13 is a side view of the lavatory enclosure 30 depicted in FIG. 12. The relationship between the various elements of the lavatory enclosure 30 are visible in this view, which is taken from a position aft of the lavatory enclosure 30, facing toward the front of the aircraft.

Figure 14:
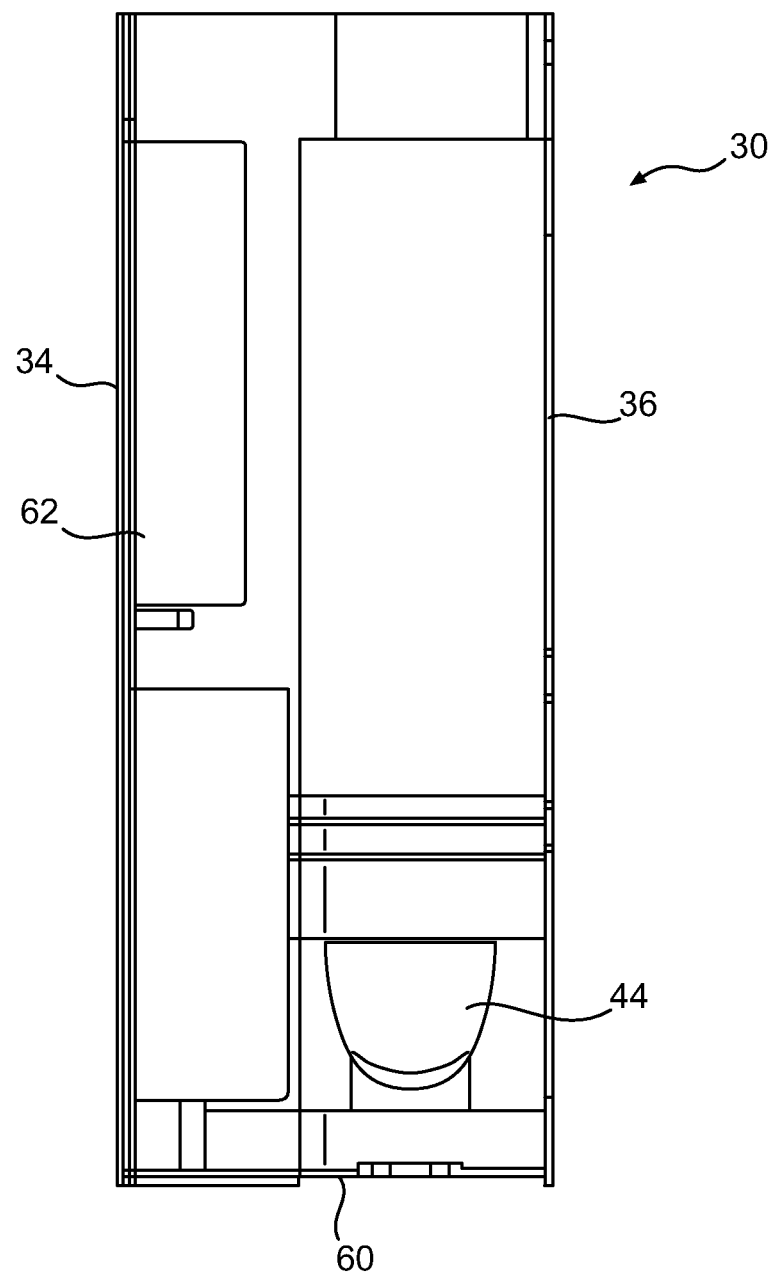
FIG. 14 is a side view of the lavatory enclosure illustrated in FIG. 12, taken from the vantage point of a person standing in an aisle of the aircraft, facing the fuselage wall of the aircraft.

FIG. 14 is a side view illustration of the lavatory enclosure 30 shown in FIG. 12. This view is taken from the vantage point of a person standing in the aisle 14, looking toward the fuselage wall 32. The offset position of the door 114 is plainly evident from this illustration. In addition, the narrow footprint of the lavatory enclosure 30 also is more readily apparent in this illustration.

Figure 15:
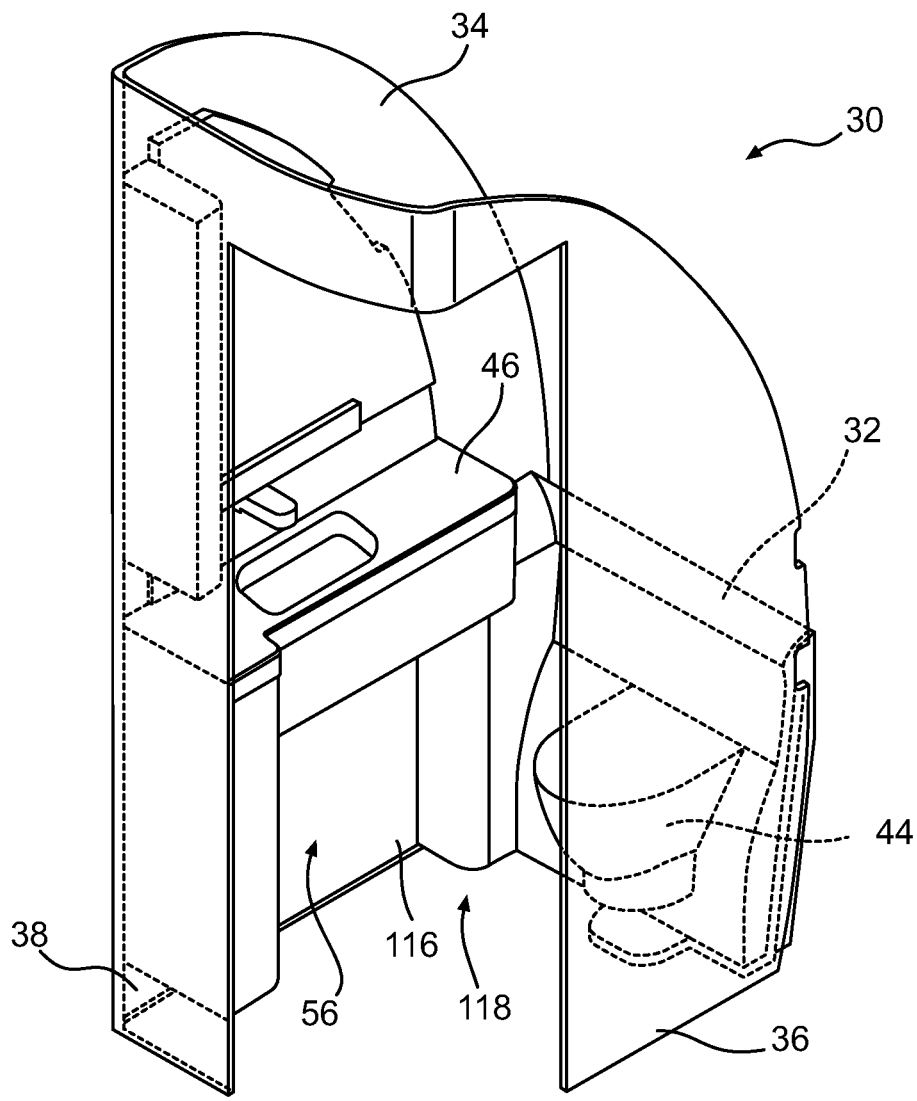
FIG. 15 is a perspective illustration of the lavatory enclosure shown in FIG. 12.

FIG. 15 is a perspective illustration of the lavatory enclosure 30 illustrated in FIG. 12. In this illustration, the recess wall 116 is clearly visible. The recess wall 116 defines one side of the countertop recess 56 beneath the countertop 46, as discussed above. In addition, this view more clearly identifies the leg space 118 that is defined between the recess wall 116 and the toilet 44. The leg space 118 is the area in which the person 26 in the wheelchair 28 will position his legs after entry into the lavatory enclosure 30 along the access axis 70, as discussed in detail above.

Figure 16:
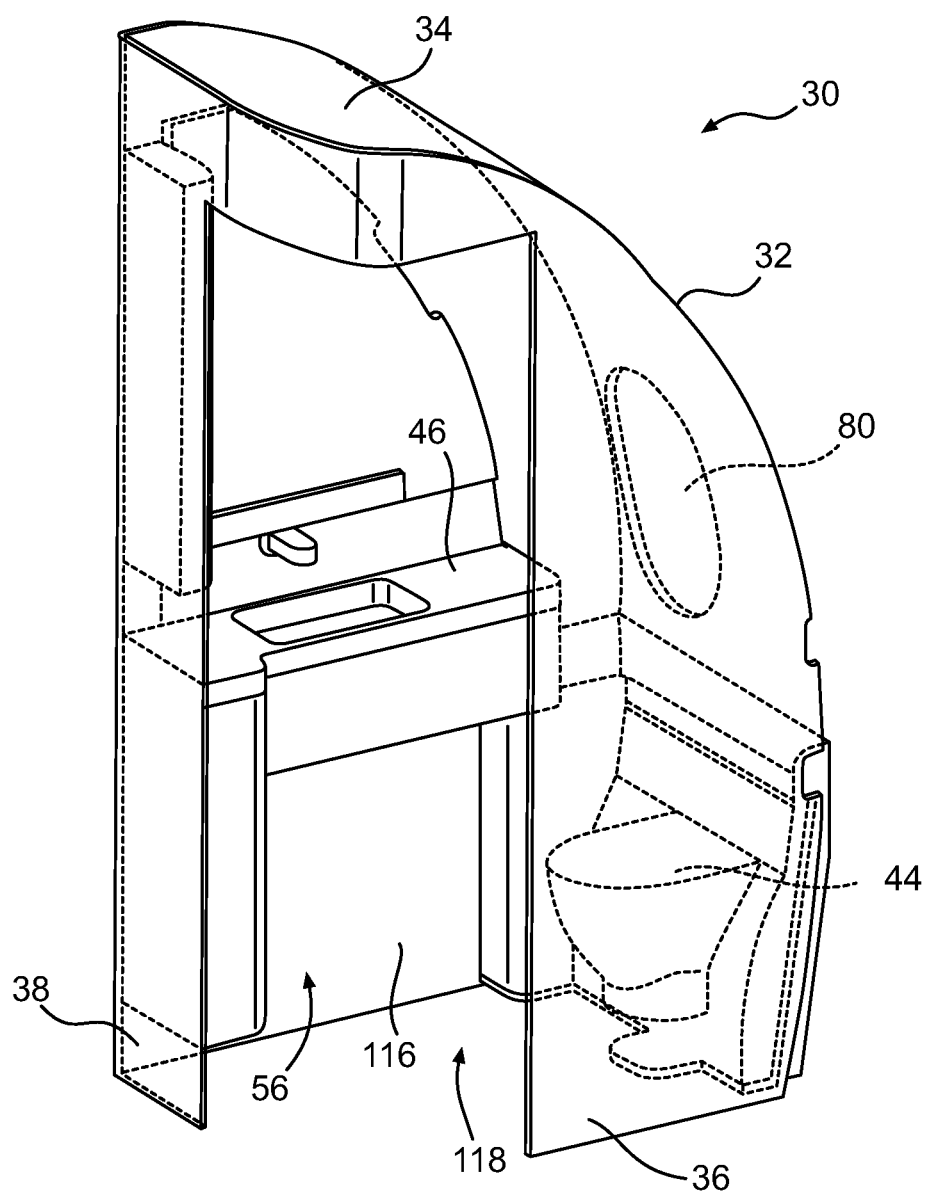
FIG. 16 is another perspective illustration of the lavatory enclosure depicted in FIG. 12, the perspective being taken from a different vantage point.

FIG. 16 is another perspective illustration of the lavatory enclosure 30 illustrated in FIG. 12. Here, the recess wall 116, the countertop recess 56, and the leg space 118 are well defined. In addition, the position of the window 80 is provided in this view.

Figure 17:
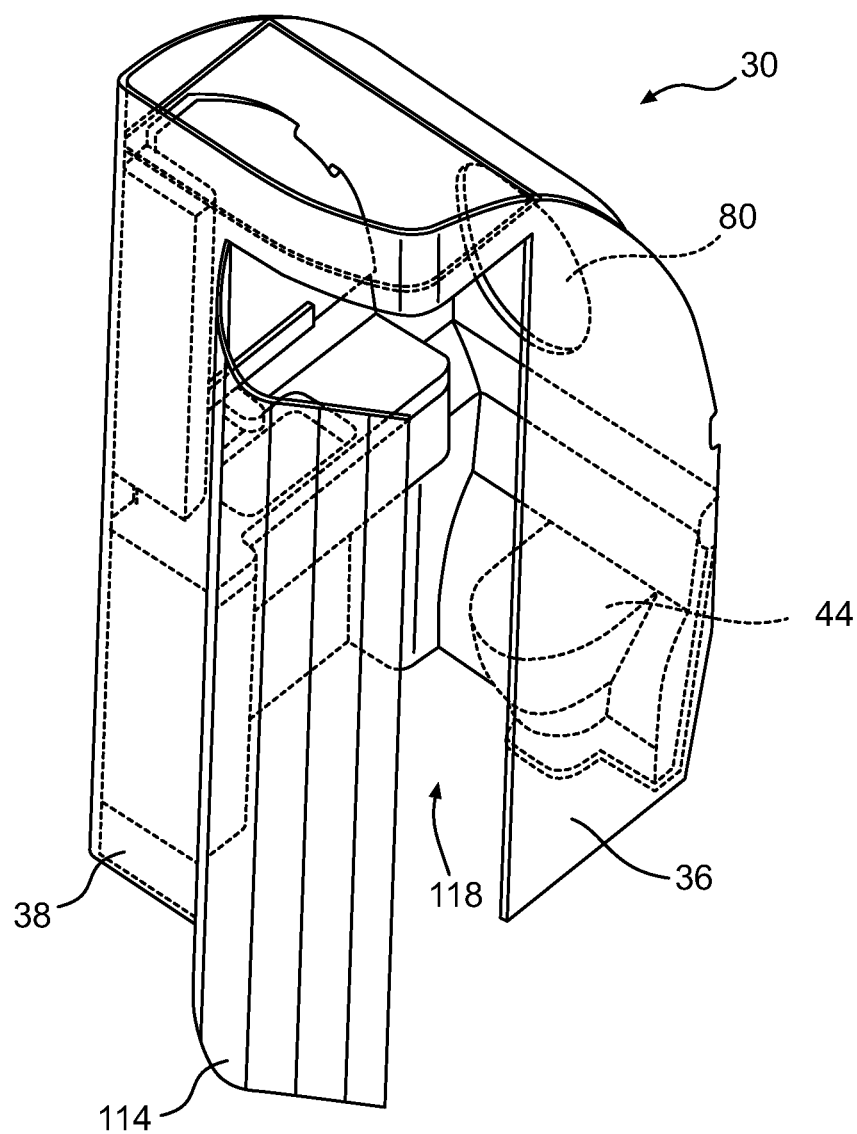
FIG. 17 is a perspective illustration of the lavatory enclosure shown in FIG. 12, where the door to the enclosure is included.

FIG. 17 is a perspective illustration of the lavatory enclosure 30 shown in FIG. 12. In this view, the door 114 is shown in a partially opened position to illustrate the manner in which the door 114 connects the aft wall 36 to the interior wall 38.

Figure 18:
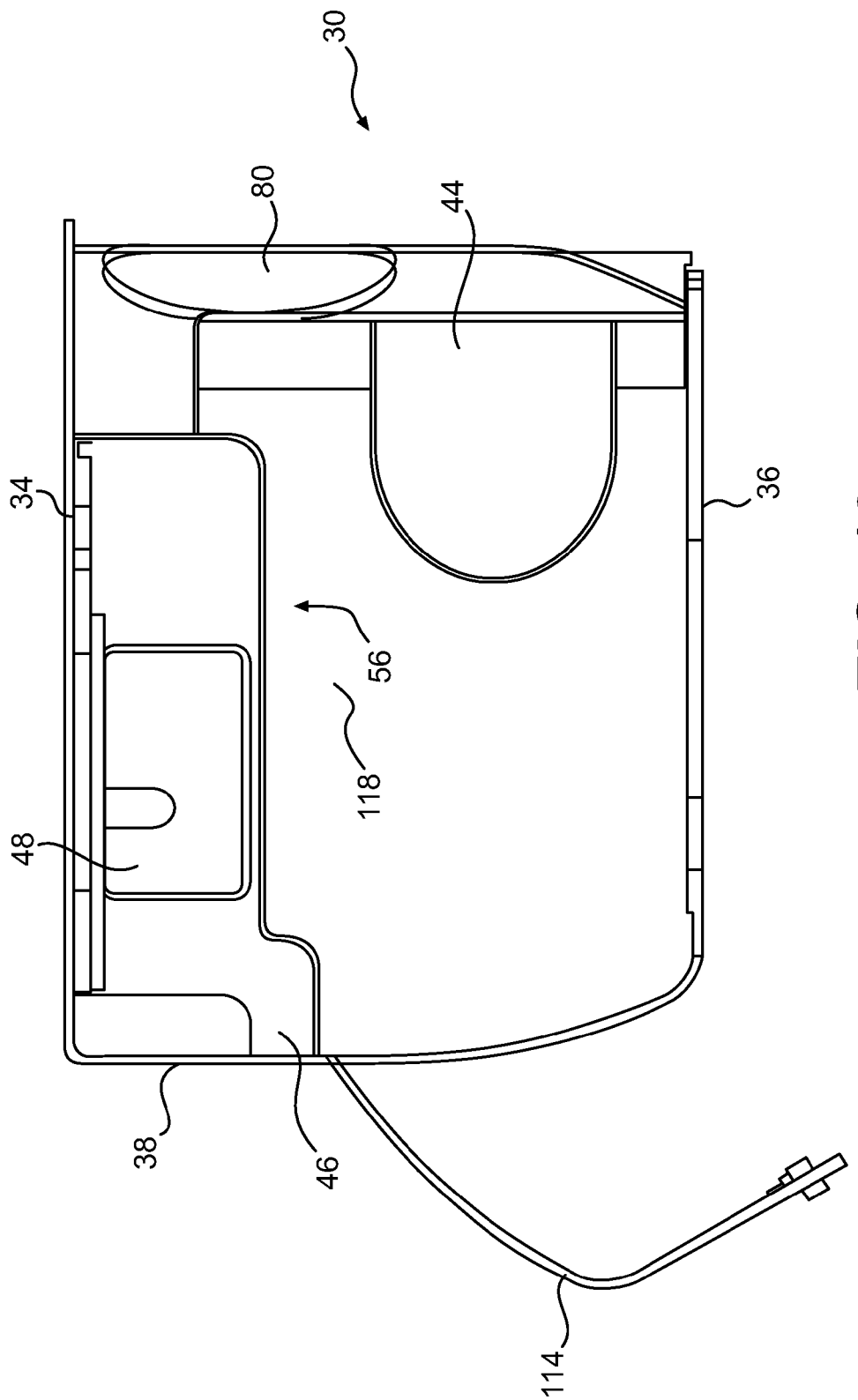
FIG. 18 is a top view of the lavatory enclosure shown in FIG. 17, showing the door in a partially opened position.

FIG. 18 is a top view of the lavatory enclosure 30 shown in FIG. 17. In this view, the position and shape of the door 114 is more readily discernible.

With respect to the various embodiments of the lavatory enclosure 30 of the present invention, it is contemplated that a ratio will exist between an area of the lavatory defined by the walls 32, 34, 36 38 and a toilet area defined by the toilet 44. Specifically, a ratio between the lavatory area and the toilet area is between about 1:4 to 2:5. More specifically, the ratio is about 1.5:4.5. As should be apparent to those skilled in the art, other ratios may be employed without departing from the scope of the present invention.

Figure 19:
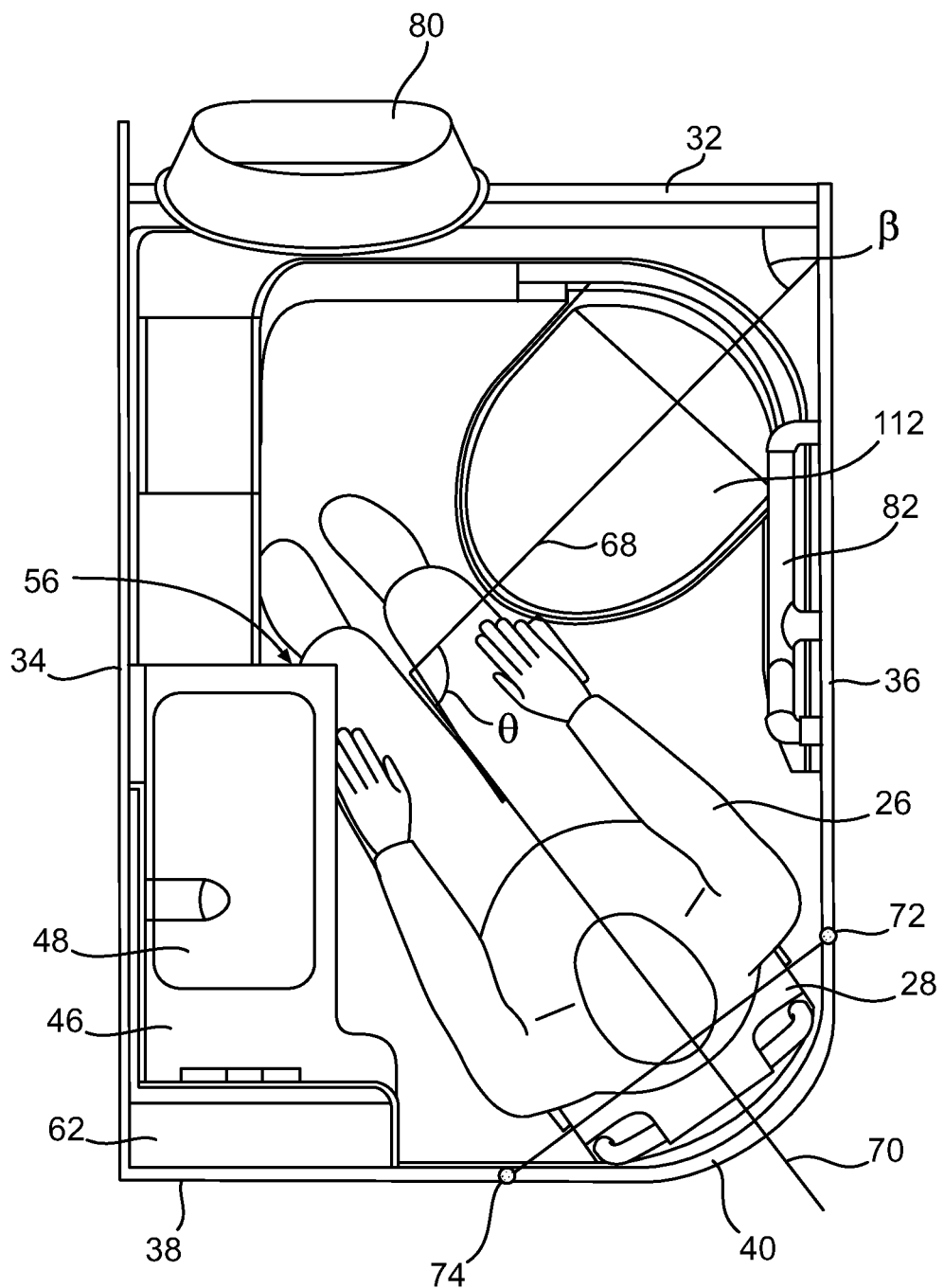
FIG. 19 is a top view of a variation of the lavatory illustrated graphically in FIG. 11, showing additional detail consistent with the present invention.

FIG. 19 is a top view of a variation of the lavatory depicted in FIG. 11. Additional details concerning specific aspects of the lavatory are provided for clarity. A person 26 is illustrated in this view, consistent with the discussion provided above. As is apparent, the person 26 is seated on a wheelchair 28 with his or her legs disposed within the countertop recess 56. Specifically, the person's left leg is within the countertop recess 56.

FIGS. 20-24 illustrate generally the steps by which a person 26 in a wheelchair 28 might access the lavatory enclosure 30. As noted above, one attractive aspect of the lavatory enclosure 30 of the present invention lies in the fact that a person 26 accesses the lavatory enclosure 30 in a face-forward manner, rather than backing into the lavatory enclosure 30.

Figure 20:
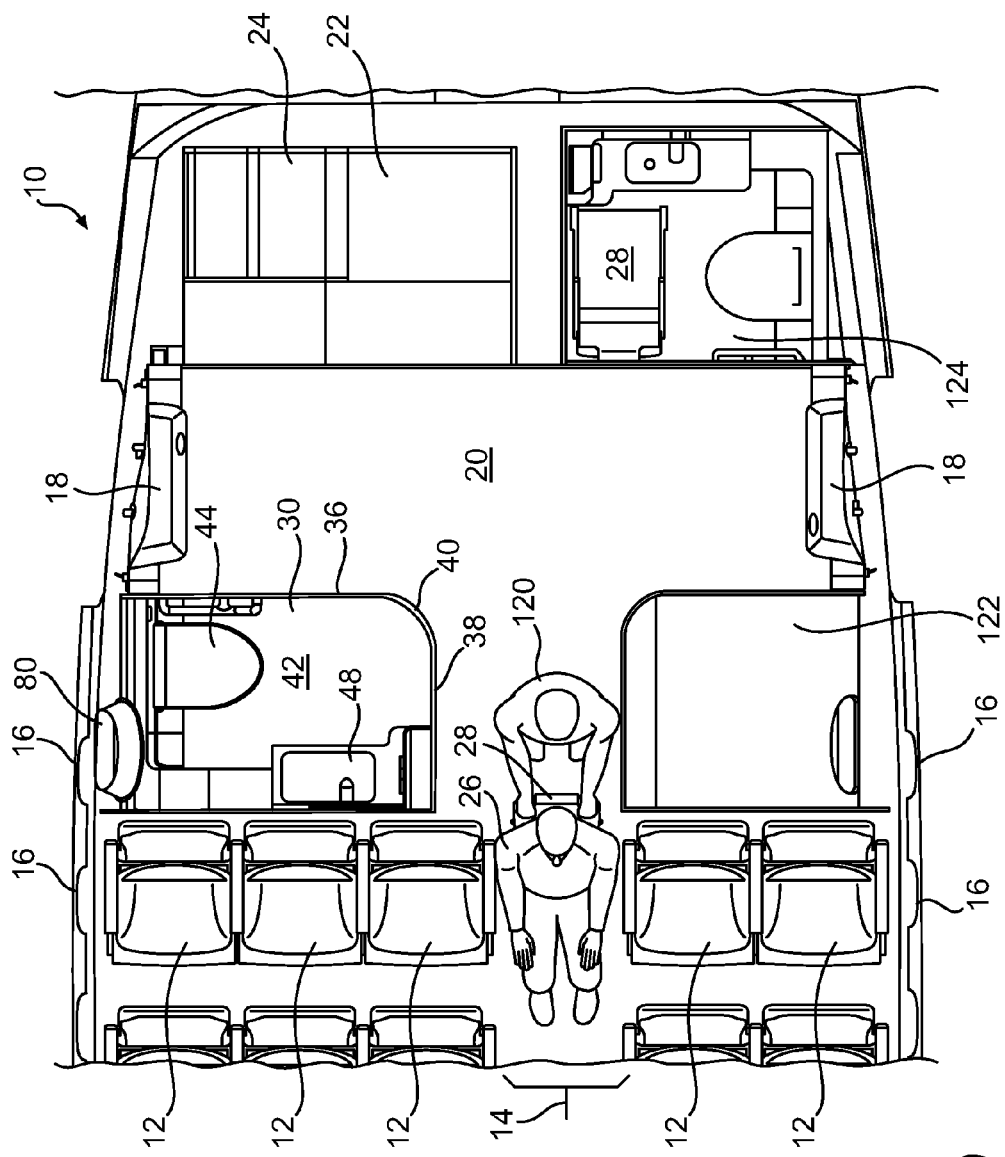
FIG. 20 is a top view of a rear portion of an aircraft including the lavatory depicted in FIG. 5, showing an approach by a passenger in a wheelchair.
Figure 21:
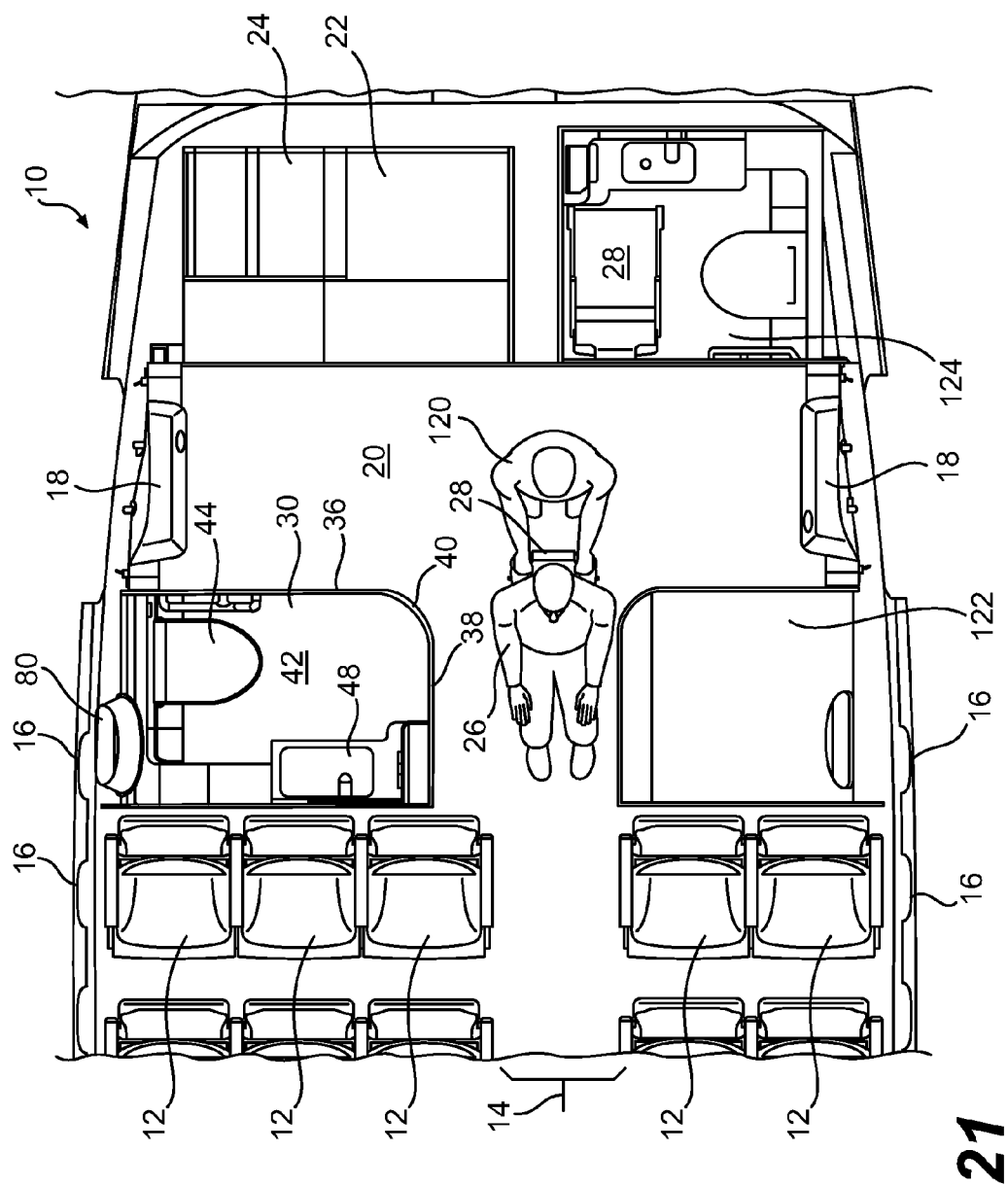
FIG. 21 is a top view of the rear portion of the aircraft illustrated in FIG. 20, showing the passenger in a wheelchair at a position closer to the lavatory.

FIG. 20 illustrates the person 26 in the wheelchair 28, in an instance where the person 26 is being assisted by a non-PRM person 120, such as a crew member or flight attendant. As illustrated, when assisting a person 26 in a wheelchair 28, it is appropriate to wheel the person 26 backwards down the aisle 14. One reason for this is that, if the person 26 where wheeled down the aisle in a forward-facing manner, it is possible that the person's legs might snag on one or more obstacles, including seats 12, that flank either side of the aisle 14. Since a PRM person 26 in a wheelchair 28 typically lacks sensory function in his or her legs, the person 26 might not feel that his or her legs have become snagged. As a result, there is perceived to be a greater likelihood of injury if a PRM person 26 is pushed down the aisle 14 rather than being pulled, in a rearward-facing direction, down the aisle 14.

In connection with FIGS. 20-24, as noted above, it is atypical for a PRM person 26 to move himself or herself down the aisle 14 while in a wheelchair 28. However, if the PRM person 26 were to engage in this behavior, it is contemplated that the person could transit the aisle 14 in a forward-facing direction.

With continued reference to FIG. 20, there are three lavatory enclosures 30, 122, 124 that are illustrated. It is noted that a typical aircraft might include all three lavatory enclosures 30, 122, 124 or any subset thereof.

It is conventional for those in the aircraft manufacturing industry to refer to the lavatory enclosure 122 as "Lavatory C." Lavatory enclosure 30 is often referred to as "Lavatory D." Lavatory enclosure 124 typically is referred to as "Lavatory E." As a point of reference, "Lavatory A" usually is located at the front of the aircraft, near to the flight deck. "Lavatory B," if provided, would be located at a forward position of the aircraft cabin, across the aisle 14 from Lavatory A. As should be apparent, smaller aircraft consistent with the configuration discussed herein usually do not include a "Lavatory B."

With reference to the lavatory enclosure 122, also referred to as "Lavatory C," it is contemplated that this lavatory enclosure 122 will not be PRM-accessible. Given that this lavatory enclosure 122 is positioned behind a pair of seats 12 on the port side (left side) of the aisle 14, it is unlikely that there would be sufficient space to accommodate the PRM-accessible lavatory enclosure 30, as discussed above. As a result, it is more likely that the lavatory enclosure 122 will not be designed to accommodate a PRM person 26.

The lavatory enclosure 124, which is also referred to as "Lavatory E," is contemplated to accommodate a PRM person 26. The details of the lavatory enclosure 124 are provided below in connection with FIGS. 25-29.

Returning to FIGS. 20-24, FIG. 21 provides a top view of a PRM person 26 in a wheelchair 28, at a point within the aircraft interior 10 just behind the last row of seats 126. At this point, the PRM person 26 remains in a position facing the front of the aircraft. It is at this position that the non-PRM person 120 begins to alter his or her travel direction to direct the PRM person 26 to the lavatory enclosure 30.

Figure 22:
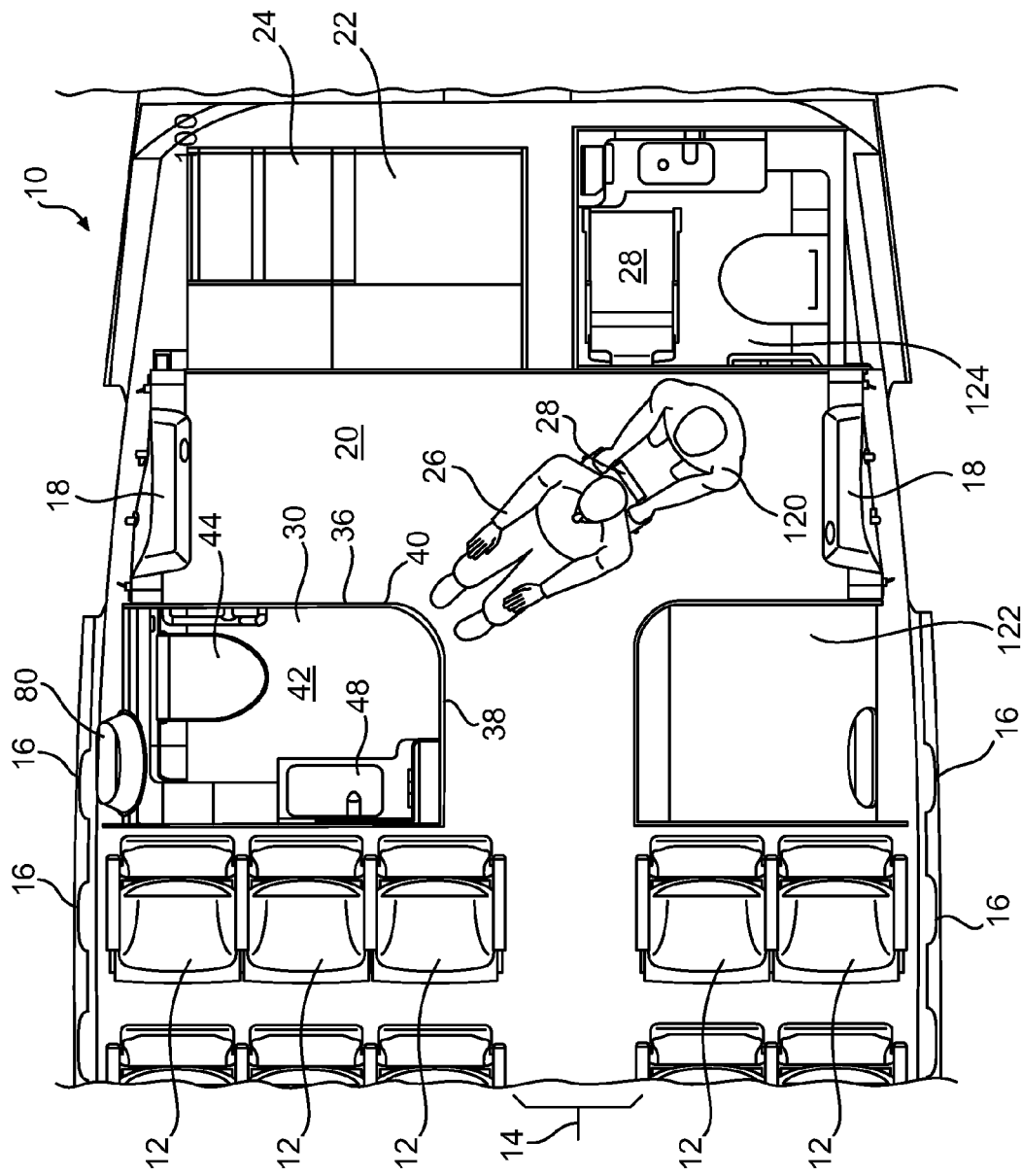
FIG. 22 is a top view of the rear portion of the aircraft illustrated in FIG. 20, showing the passenger in a wheelchair in a position prior to entry into the lavatory.

FIG. 22 illustrates how the PRM person 26 is angled in the galley area 20 so that the PRM person 26 faces the door 40 to the lavatory enclosure 30. From this position, it is possible for the PRM person 26 to access the lavatory enclosure 30 in a face-forward manner.

Figure 23:
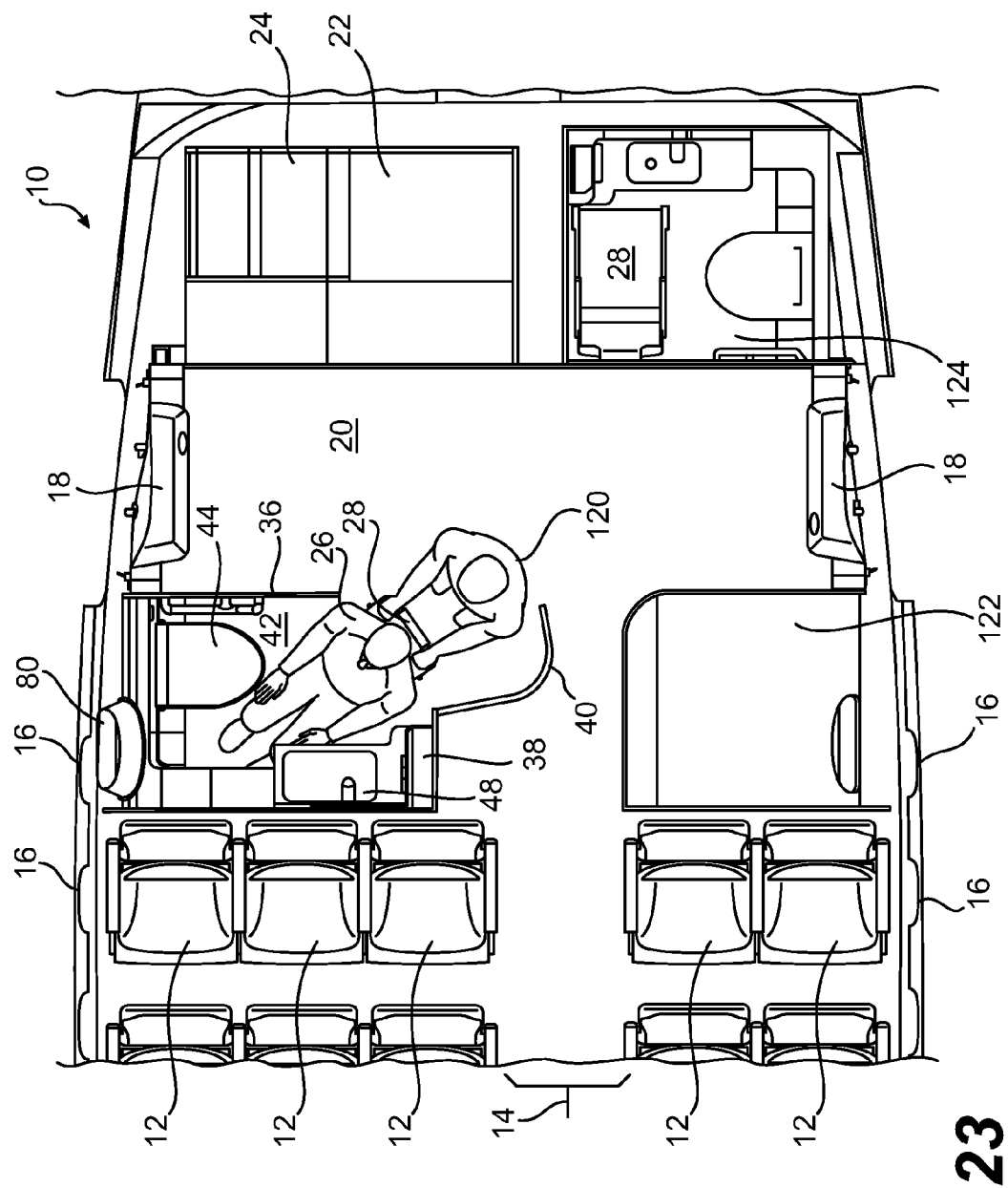
FIG. 23 is a top view of the rear portion of the aircraft illustrated in FIG. 20, showing the passenger in a wheelchair in a position immediately after entry into the lavatory.

FIG. 23 is a top view that illustrates the lavatory enclosure 30 with the door 40 opened and the PRM person 26 within the lavatory enclosure 30.

Figure 24:
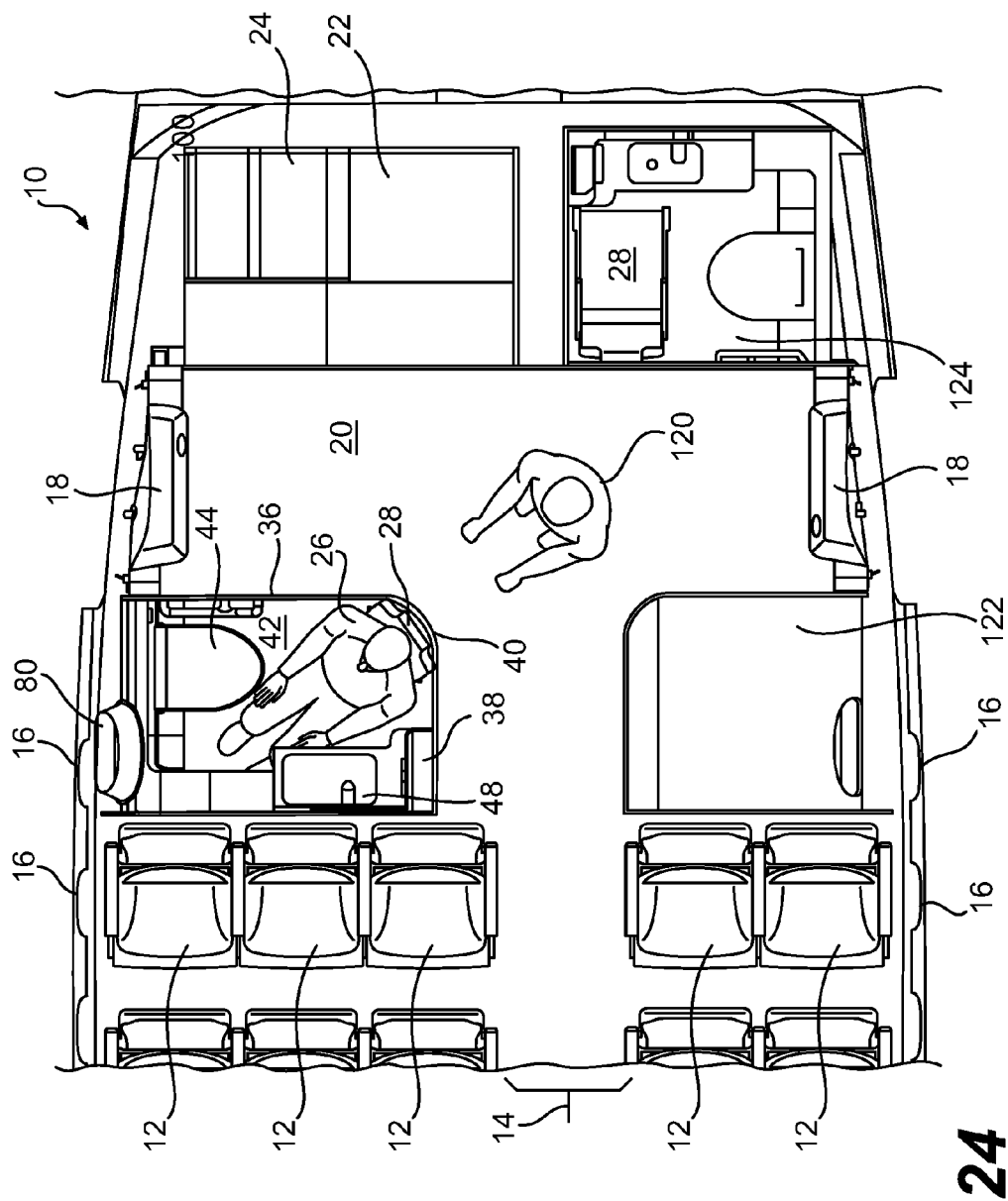
FIG. 24 is a top view of the rear portion of the aircraft illustrated in FIG. 20, showing the passenger in a wheelchair after the door to the lavatory has been closed.

FIG. 24 is a top view of the aircraft interior 10, showing the lavatory enclosure 30 with the PRM person 10 in the lavatory enclosure 30. In this view, the door 40 is closed and the non-PRM person 120 is standing in the galley area 20.

Figure 25:
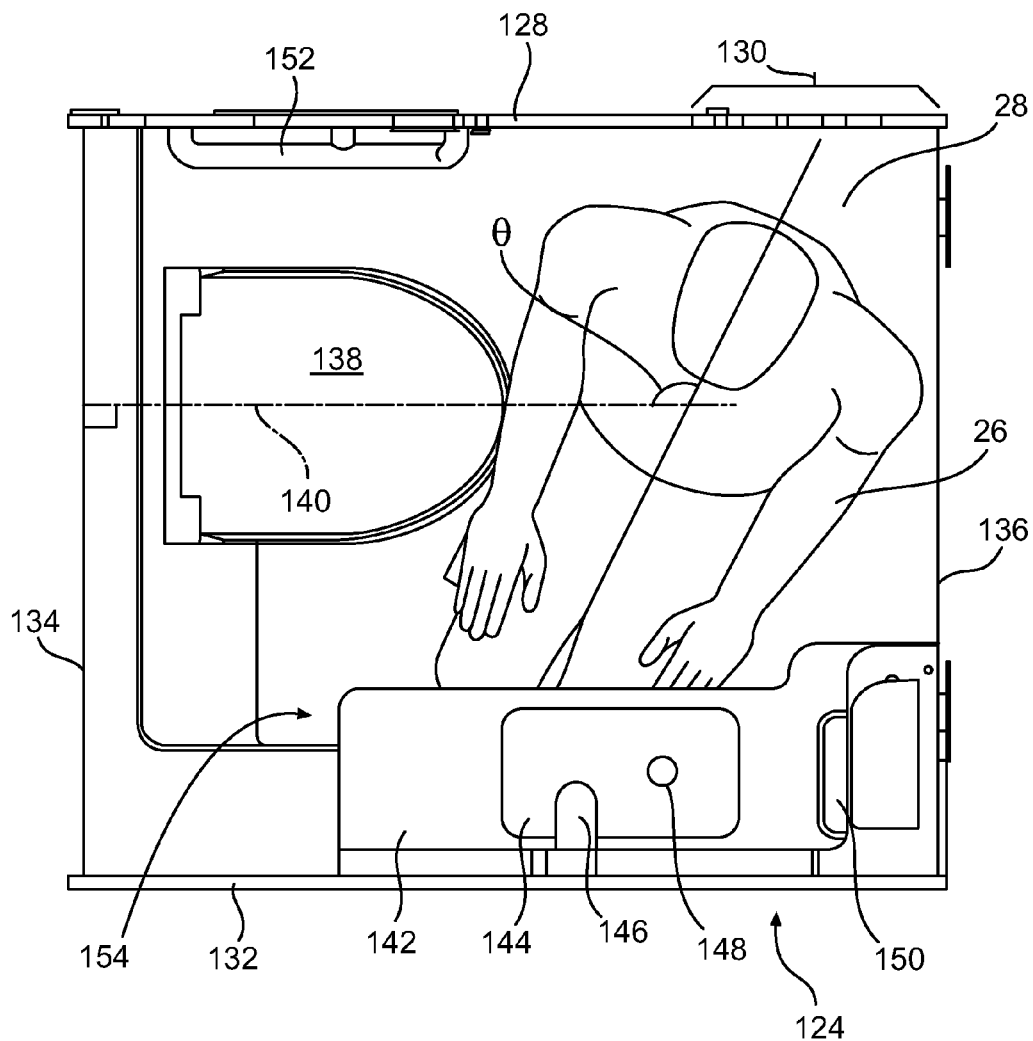
FIG. 25 is a top view of a further embodiment of a lavatory according to the present invention.

FIG. 25 is a top view of the lavatory enclosure 124, otherwise referred to as "Lavatory E." The lavatory enclosure 124 is positioned rearward of the exit door 18 on the port side of the aircraft. As illustrated, the lavatory enclosure 124 is adjacent to the galley, which includes the cabinets 22 and work spaces 24. As also illustrated, the lavatory enclosure 124 is positioned at the aftmost position within the aircraft cabin.

The lavatory enclosure 124 is defined by a first or forward wall 128 that extends along the galley area 20. A door 130 opens through the first wall 128 to permit ingress and egress from the lavatory enclosure 124. A second or rear wall 132 runs parallel to the first wall 128. Third and fourth lateral walls 134, 136 complete the lavatory enclosure 124 by connecting the first and second walls 128, 132. The third wall 134 is contemplated to be parallel to the exterior of the aircraft. Accordingly, the third wall 134 may be a fuselage wall and may include a window, if available.

As should be apparent from FIG. 25, the door 130 is positioned in the forward wall 128 at or near the juncture with the fourth wall 136. With the door 130 in this location, access to the amenities within the lavatory enclosure 124 is assured.

A toilet 138 is positioned along the third wall 134 at a position closer to the first wall 128 than to the second wall 132. The toilet 138 has a centerline 140 that extends essentially perpendicularly to the third wall 134 and fourth walls 136 and parallel to the first and second walls 128, 132.

A countertop 142 extends along the second wall 132. A sink 144 is sunk into the countertop 142. A faucet 146 and drain 148 are associated with the sink 144. A trash bin 150 also is provided in the countertop 142, near to the fourth wall 136. A handle 152 is affixed to the first wall 128 in a position near to the toilet 138.

As with the lavatory enclosure 30, the lavatory enclosure 124 includes a countertop recess 154 beneath the countertop 142. As indicated in FIG. 25, the countertop recess 154 provides a volume of space under the countertop 142 where the legs of the person 26 may extend upon entry into the lavatory enclosure 124.

In FIG. 25, the person 26 is shown in a nearly perpendicular orientation with respect to the centerline 140 of the toilet 138. The person's legs are at least partially disposed in the countertop recess 154 defined beneath the countertop 142.

One advantage of the design of the lavatory enclosure 124 lies in the direct approach that a PRM person 26 may take with respect to the lavatory enclosure 124. As should be immediately apparent, this direct approach differs from the angled approach that is required for the lavatory enclosure 30.

Figure 26:
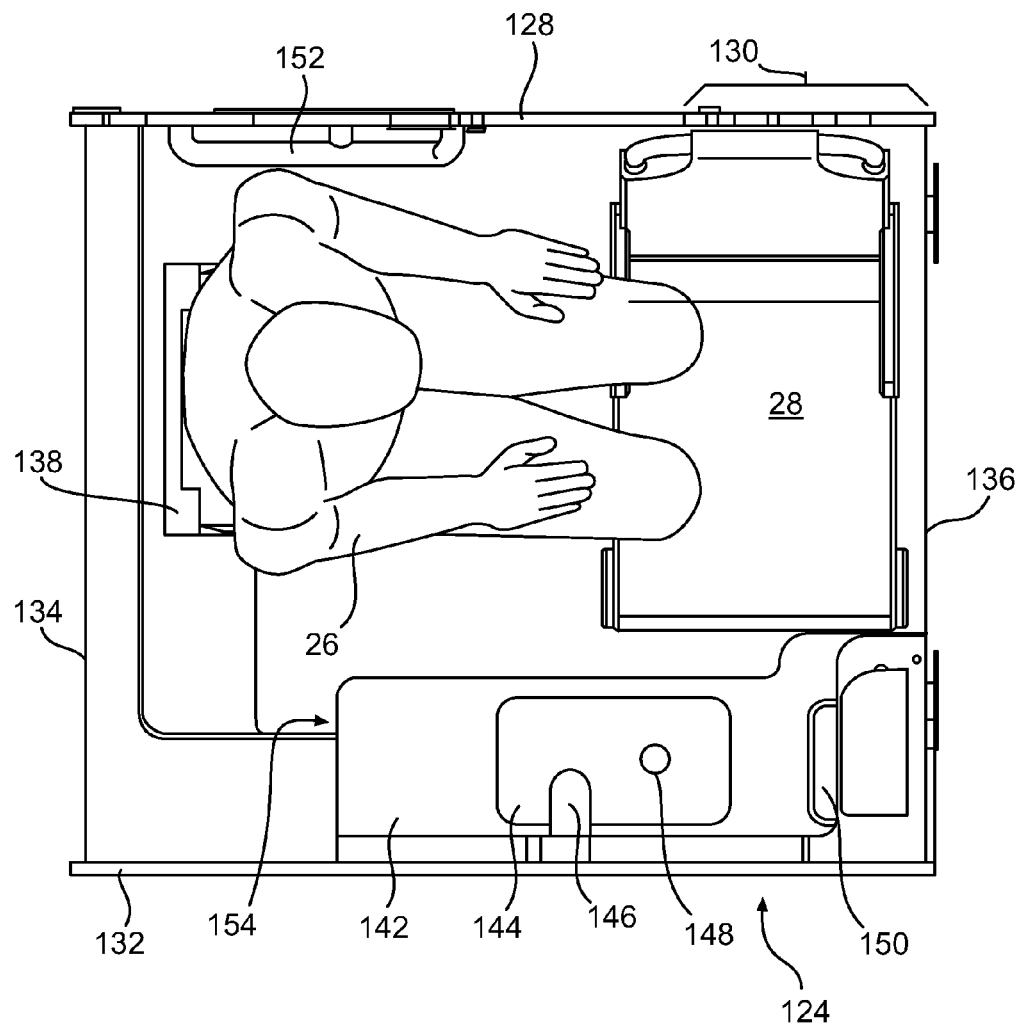
FIG. 26 is a top view of the lavatory illustrated in FIG. 25, showing the passenger sitting on the toilet.

FIG. 26 is a top view of the lavatory enclosure 124 depicted in FIG. 25. In this view, the PRM person 26 has transitioned from the wheelchair 28 to the toilet 138. The wheelchair 28 is shown positioned against the fourth wall 136.

It is noted that a larger person 26 will likely be required to angle the wheelchair 28 slightly, upon entry into the lavatory enclosure 124, as shown in FIG. 25. A smaller person 26, however, is likely to be able to enter the lavatory enclosure 124 without the need for angling the wheelchair 28. In both instances, it is contemplated that the person 26 will take advantage of the countertop recess 152 beneath the countertop 142.

In FIG. 25, the toilet 138 is illustrated as having a centerline 140 that is perpendicular to the third wall 134 of the lavatory enclosure 124. It is contemplated that the centerline 140 may be angled with respect to the third wall 134 without departing from the scope of the present invention. However, it is contemplated that, due to the layout of the lavatory enclosure 124, an angled orientation for the toilet 138 will not be necessary.

With respect to FIG. 25, it is contemplated that the person 26, after entering the lavatory enclosure 124 through the door 130, will be disposed such that a centerline 170 of the person 26 is disposed at an angle θ with respect to the centerline 140 of the toilet 138. The angle θ is expected to be about 120°. As should be apparent, this angle θ of 120° is less than the angle θ of 135°, which is expected for the lavatory enclosure 30, as depicted in FIG. 4. The reason for this lies in the fact that the door 130 is coplanar with the first wall 128 and does not extend between two walls, as provided for in the lavatory enclosure 30.

As should be apparent in FIG. 25, it is contemplated that the person's centerline 170 will be disposed at an angle θ of 120°±15°. In an alternate embodiment, the angle θ is 120°±10°. In still another embodiment, the angle θ is 120°±5°. As should be apparent, further embodiments are contemplated to fall within the scope of the present invention.

Figure 27:
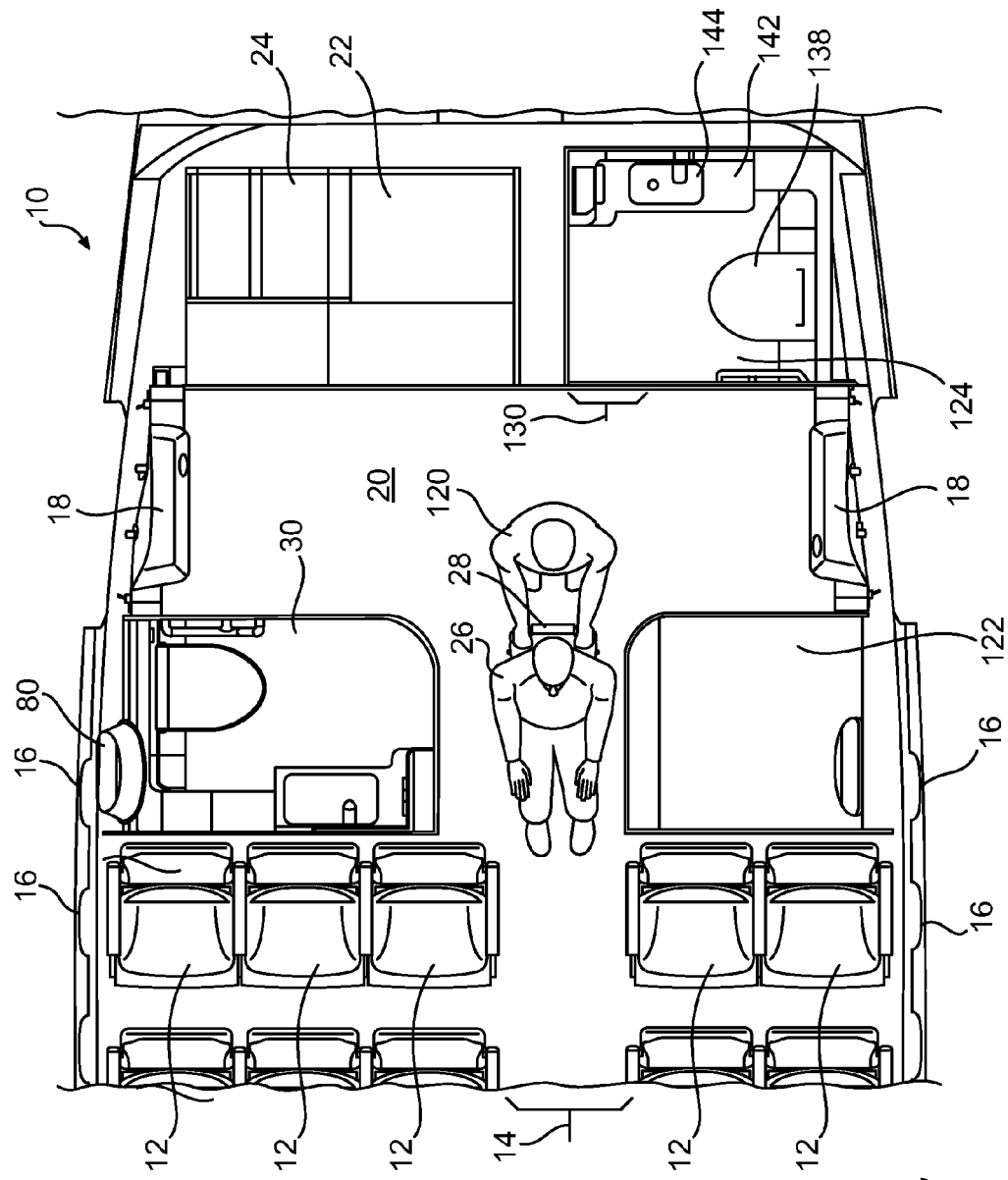
FIG. 27 is a top view of the rear portion of the aircraft illustrated in FIG. 20, showing the passenger in a wheelchair as the passenger is moving down the aisle toward the lavatory.
Figure 28:
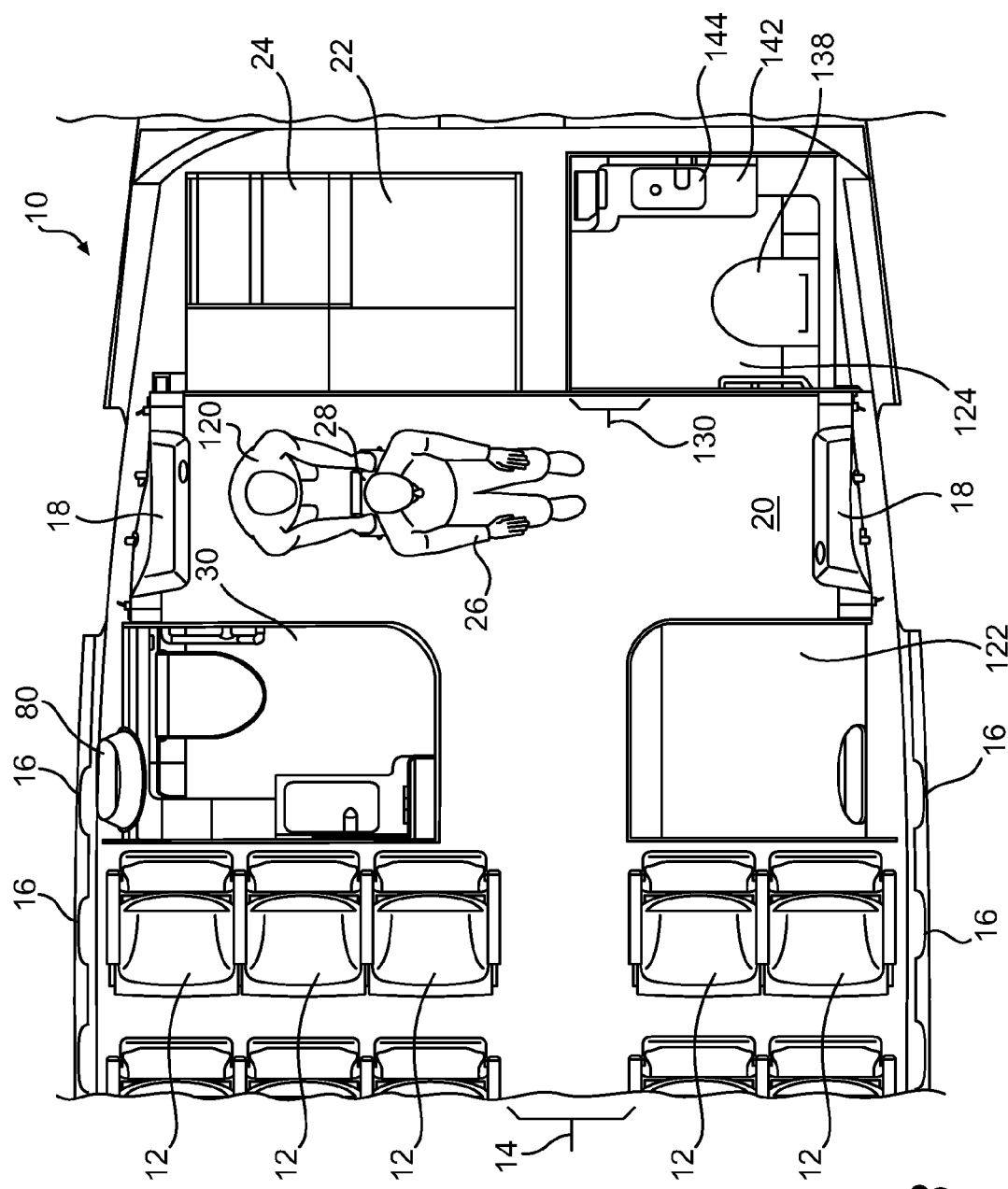
FIG. 28 is a top view of the rear portion of the aircraft illustrated in FIG. 20, showing the passenger in a wheelchair in a position prior to entry into the lavatory illustrated in FIG. 25.
Figure 29:
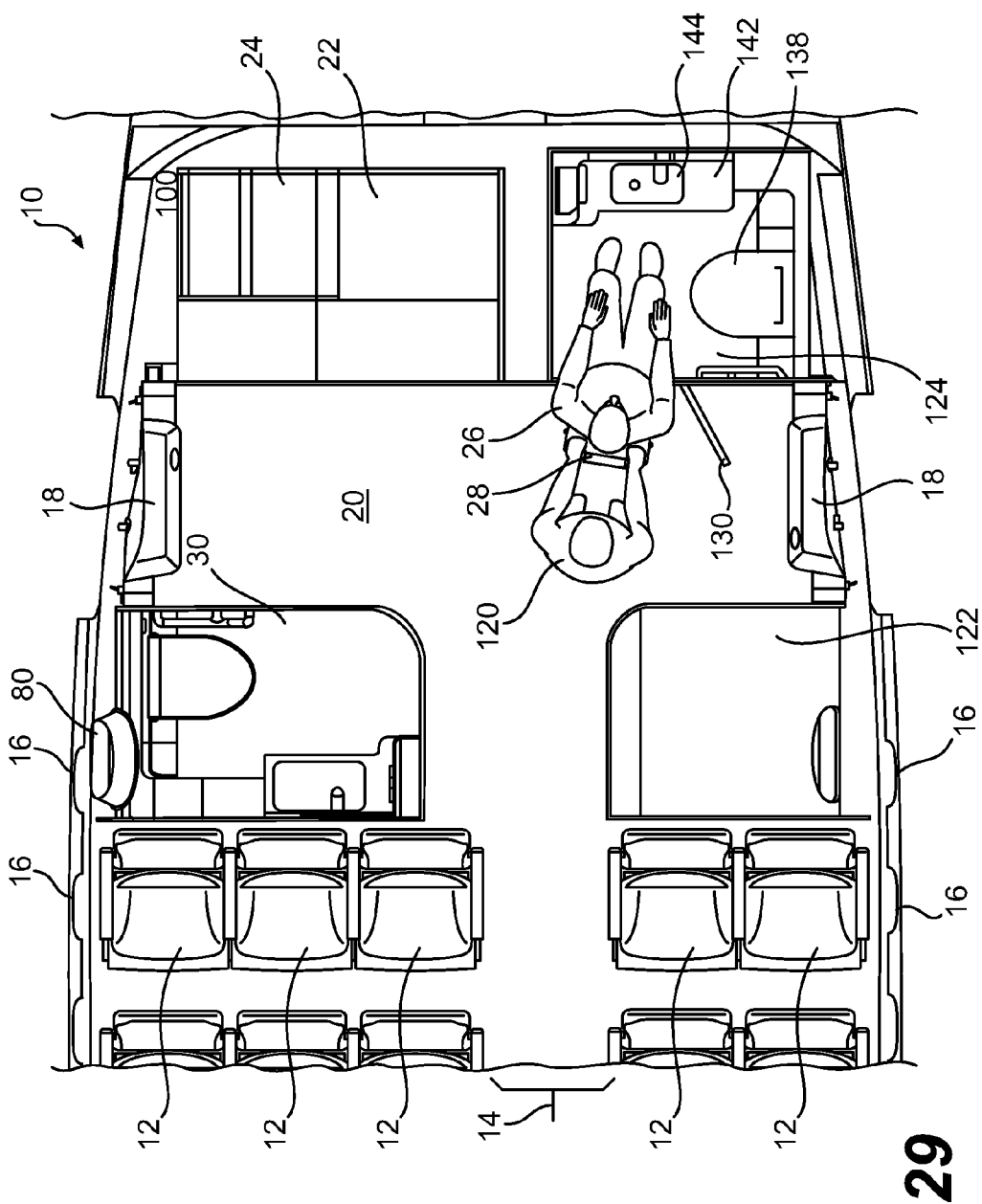
FIG. 29 is a top view of the rear portion of the aircraft illustrated in FIG. 20, showing the passenger in a wheelchair in a position during entry into the lavatory illustrated in FIG. 25.

FIGS. 27-29 will now be relied upon to describe the procedure by which a PRM person 26 is anticipated to enter the lavatory enclosure 124. FIGS. 27-29 are similar to FIGS. 20-24, which were provided to describe the same procedure with respect to the lavatory enclosure 30.

FIG. 27 is a top view of a portion of the aircraft interior 10. As shown, the PRM person 26 in the wheelchair 28 is anticipated to be moved down the aisle 14 backwards. The PRM person 26 is expected to require assistance from a non-PRM person 120, such as a crew member or flight assistant.

FIG. 28 illustrates how the person 26 is transitioned from a forward-facing direction to a laterally-facing direction, using the floor space available in the galley area 20.

FIG. 29 illustrates the PRM person 26 entering the lavatory enclosure 124 in a forward-facing manner. In other words, as discussed above, the person 26 enters the lavatory enclosure 124 directly.

As should be apparent from the foregoing, the lavatory enclosures 30, 124 each include a countertop recess 56, 154 that establishes a volumetric space beneath the countertop 46, 142. The recess 56, 154 accommodates the legs of the PRM person 26. This permits the person 26 to access the lavatory enclosures 30, 124 while seated on a wheelchair 28.

With reference to FIGS. 5 and 25, it is noted that there are several similarities between the lavatory enclosures 30, 124. Specifically, in each embodiment, the person 26 enters the lavatory enclosure 30, 124 in a face-forward manner. In each embodiment, the sink 48, 144 is disposed across from the door 40, 130. In each embodiment, the countertop recess 56, 154 also is positioned across from the door 40, 154. In each case, the access axis 70, 170 defines an angle θ with respect to the centerline 68, 140 of the toilet 44, 138. With respect to the lavatory enclosure 30, the angle θ is about 135°±15°. For the lavatory enclosure 124, the angle θ is about 120°±15°. In each case, the angle θ reduces the angle through which the person 26 needs to transition his or her body to move from the wheelchair 28 to the toilet 44, 138.

Turning to FIG. 29, another aspect of the present invention becomes apparent. Specifically, the aircraft interior 10 accommodates two lavatory enclosures 30, 124 that permit access by a PRM person 26. It is not typical for a single aisle aircraft to include two PRM-accessible lavatory enclosures 30, 124.

With respect to this aspect of the present invention, it is noted that the configuration of the aircraft interior 10 is such that it accommodates two PRM-accessible lavatory enclosures 30, 124, especially where the lavatory enclosures 30, 124 incorporate the countertop recesses 56, 154 as discussed above.

Therefore, one aspect of the present invention is an aircraft interior 10 that accommodates two PRM-accessible lavatory enclosures 30, 124, one on either side of the aisle 14 of the aircraft. Another aspect of the present invention is that the PRM-accessible lavatories 30, 124 are disposed on opposite sides of the galley area 20 within the aircraft interior 10.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. An aircraft lavatory, comprising:
   a first wall extending inwardly from a second wall;
   a third wall extending inwardly from the second wall, wherein the third wall is spaced apart from the first wall by a predetermined distance;
   a fourth wall connecting the first wall to the third wall, wherein the first wall, the second wall, the third wall, and the fourth wall together establish an enclosure encompassing a lavatory area;
   a countertop disposed adjacent to the first wall, extending along at least a portion of the first wall;
   a sink disposed at a position in the countertop, wherein the countertop defines an under-countertop recess free from obstructions;
   a toilet disposed adjacent to both the second wall and the third wall, wherein the toilet defines a toilet area that occupies a portion of the lavatory area and wherein the toilet defines a toilet axis bisecting the toilet; and
   a door extending from a first predetermined position on the third wall to a second predetermined position on the fourth wall such that the door defines an intersection between the third wall and the fourth wall, wherein a line extending substantially perpendicularly from a center point between the first predetermined position and the second predetermined position defines an access axis disposed at an access angle with respect to the toilet axis;
   wherein, when a person in a wheelchair enters the lavatory area in a forward-facing direction along the access axis, the countertop recess accommodates at least a portion of the person's legs when the person in the wheelchair is positioned along the access axis, thereby permitting the person to transition from the wheelchair to the toilet by shifting the person's body through the access angle,
   wherein the countertop recess is defined in part by a recess wall,
   wherein a leg space is defined between the recess wall and the toilet, and
   wherein the leg space accommodates at least a portion of the person's legs therein when the person in the wheelchair is positioned along the access axis.

2. The aircraft lavatory of claim 1, wherein the second wall is a wall of the fuselage of the aircraft.

3. The aircraft lavatory of claim 2, wherein the first wall is positioned along the fuselage wall such that at least one window in the fuselage wall is positioned between the first wall and the third wall, thereby locating the window within the aircraft lavatory.

4. The aircraft lavatory of claim 1, wherein the countertop recess and the leg recess are positioned in an overlapping relationship.

5. The aircraft lavatory of claim 1, wherein the access angle is between about 90° to 180°.

6. The aircraft lavatory of claim 5, wherein the access angle is between about 120° to 150°.

7. The aircraft lavatory of claim 6, wherein the access angle is between about 125° to 145°.

8. The aircraft lavatory of claim 7, wherein the access angle is between about 130° to 140°.

9. The aircraft lavatory of claim 8, wherein the access angle is about 135°.

10. The aircraft lavatory of claim 5, wherein the access angle is between about 105° to 135°.

11. The aircraft lavatory of claim 10, wherein the access angle is between about 110° to 130°.

12. The aircraft lavatory of claim 11, wherein the access angle is between about 115° to 125°.

13. The aircraft lavatory of claim 12, wherein the access angle is about 120°.

14. The aircraft lavatory of claim 1, wherein a ratio between the lavatory area and the toilet area is between about 1:4 to 2:5.

15. The aircraft lavatory of claim 14, wherein the ratio is about 1.5:4.5.

16. The aircraft lavatory of claim 1, wherein the first wall is substantially parallel to the third wall.

17. The aircraft lavatory of claim 16, wherein the fourth wall is substantially perpendicular to the first and third walls.

18. The aircraft lavatory of claim 1, wherein the door is L-shaped and defines a corner between the third wall and the fourth wall.

19. The aircraft lavatory of claim 1, wherein the door defines a curve extending from the first predetermined position to the second predetermined position.

20. The aircraft lavatory of claim 1, further comprising:
    at least one hand rail mounted on the third wall, wherein the at least one hand rail provides a support, graspable by the person, to assist the person to transition from the wheelchair to the toilet.

21. The aircraft lavatory of claim 1, wherein the enclosure is adapted to be positioned within an aircraft having a configuration with a single aisle.

22. The aircraft lavatory of claim 21, wherein the fourth wall extends along at least a portion of one side of the aisle.

23. The aircraft lavatory of claim 1, wherein the toilet is fixed in position within the enclosure.

24. The aircraft lavatory of claim 1, wherein the sink is positioned closer to the fourth wall than the second wall.

25. The aircraft lavatory of claim 1, defines the toilet axis extends substantially perpendicularly to a plane defined by the second wall.

26. The aircraft lavatory of claim 1, wherein the toilet axis forms an angle with the second wall that is about 45°.

27. The aircraft lavatory of claim 1, further comprising:
a hand grip disposed adjacent to the toilet, wherein the hand grip is pivotable from a stowed position where the handgrip is not available to assist a person to transition to the toilet to a deployed position where the hand grip is available to assist a person to transition to the toilet.

28. The aircraft lavatory of claim 27, wherein the hand grip is pivotally attached to the second wall and pivots vertically from the stowed position to the deployed position.

29. The aircraft lavatory of claim 28, wherein, when in the stowed position, the hand grip is recessed into the second wall.

30. An aircraft, comprising:
a single aisle disposed along a longitudinal axis of the aircraft;
a first lavatory; and
a second lavatory;
wherein both lavatories have a first wall extending inwardly from a second wall,
a third wall extending inwardly from the second wall, wherein the third wall is spaced apart from the first wall by a predetermined distance,
a fourth wall connecting the first wall to the third wall, wherein the first wall, the second wall, the third wall, and the fourth wall together establish an enclosure encompassing a lavatory area,
a countertop disposed adjacent to the first wall, extending along at least a portion of the first wall,
a sink disposed at a position in the countertop, wherein the countertop defines an under-countertop recess free from obstructions,
a toilet disposed adjacent to both the second wall and the third wall, wherein the toilet defines a toilet area that occupies a portion of the lavatory area and wherein the toilet defines a toilet axis bisecting the toilet, and
a door extending from a first predetermined position on the third wall to a second predetermined position on the fourth wall such that the door defines an intersection between the third wall and the fourth wall, wherein a line extending substantially perpendicularly from a center point between the first predetermined position and the second predetermined position defines an access axis disposed at an access angle with respect to the toilet axis,
wherein, when a person in a wheelchair enters the lavatory area in a forward-facing direction along the access axis, the countertop recess accommodates at least a portion of the person's legs when the person in the wheelchair is positioned along the access axis thereby permitting the person to transition from the wheelchair to the toilet by shifting the person's body through the access angle,
wherein the countertop recess is defined in part by a recess wall,
wherein a leg space is defined between the recess wall and the toilet, and
wherein the leg space accommodates at least a portion of the person's legs therein when the person in the wheelchair is positioned along the access axis.

31. The aircraft of claim 30, wherein the first lavatory is disposed on one side of the aisle and the second lavatory is disposed on the other side of the aisle.

32. The aircraft of claim 31, wherein the aircraft further comprises a galley area extending transversely to the aisle, the first lavatory is disposed forward of the galley area, and the second lavatory is disposed rearward of the galley area.

33. The aircraft of claim 30, wherein, for each lavatory, the second wall is a wall of the fuselage of the aircraft.

34. The aircraft of claim 30, wherein the access angle is between about 90° to 180°.

35. The aircraft of claim 34, wherein, for the first lavatory, the access angle is between about 120° to 150°.

36. The aircraft of claim 35, wherein the access angle is between about 125° to 145°.

37. The aircraft of claim 36, wherein the access angle is between about 130° to 140°.

38. The aircraft of claim 37, wherein the access angle is about 135°.

39. The aircraft of claim 34, wherein, for the second lavatory, the access angle is between about 105° to 135°.

40. The aircraft of claim 39, wherein the access angle is between about 110° to 130°.

41. The aircraft of claim 40, wherein the access angle is between about 115° to 125°.

42. The aircraft of claim 41, wherein the access angle is about 120°.

43. An aircraft, comprising:
a fuselage defining a cabin therein; and
a lavatory within the cabin comprising
a first wall extending inwardly from a second wall,
a third wall extending inwardly from the second wall, wherein the third wall is spaced apart from the first wall by a predetermined distance,
a fourth wall connecting the first wall to the third wall, wherein the first wall, the second wall, the third wall, and the fourth wall together establish an enclosure encompassing a lavatory area,
a countertop disposed adjacent to the first wall, extending along at least a portion of the first wall,
a sink disposed at a position in the countertop, wherein the countertop defines an under-countertop recess free from obstructions,
a toilet disposed adjacent to both the second wall and the third wall, wherein the toilet defines a toilet area that occupies a portion of the lavatory area and wherein the toilet defines a toilet axis bisecting the toilet, and
a door extending from a first predetermined position on the third wall to a second predetermined position on the fourth wall such that the door defines an intersection between the third wall and the fourth wall, wherein a line extending substantially perpendicularly from a center point between the first predetermined position and the second predetermined position defines an access axis disposed at an access angle with respect to the toilet axis,
wherein, when a person in a wheelchair enters the lavatory area in a forward-facing direction along the access axis, the countertop recess accommodates at least a portion of the person's legs when the person in the wheelchair is positioned along the access axis thereby permitting the person to transition from the wheelchair to the toilet by shifting the person's body through the access angle, wherein the countertop recess is defined in part by a recess wall, wherein a leg space is defined between the recess wall and the toilet, and wherein the leg space accommodates at least a portion of the person's legs therein when the person in the wheelchair is positioned along the access axis.

* * * * *